United States Patent
Li et al.

(10) Patent No.: US 12,557,068 B2
(45) Date of Patent: Feb. 17, 2026

(54) USER EQUIPMENT AND BASE STATION INVOLVED IN PAGING

(71) Applicant: Panasonic Intellectual Property Corporation of America, Torrance, CA (US)

(72) Inventors: Hongchao Li, Langen (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 355 days.

(21) Appl. No.: 18/249,027

(22) PCT Filed: Sep. 15, 2021

(86) PCT No.: PCT/EP2021/075364
§ 371 (c)(1),
(2) Date: Apr. 13, 2023

(87) PCT Pub. No.: WO2022/078696
PCT Pub. Date: Apr. 21, 2022

(65) Prior Publication Data
US 2023/0397159 A1    Dec. 7, 2023

(30) Foreign Application Priority Data
Oct. 15, 2020    (EP) .................................... 20202146

(51) Int. Cl.
*H04W 68/00* (2009.01)
(52) U.S. Cl.
CPC ................. *H04W 68/005* (2013.01)
(58) Field of Classification Search
CPC ............. H04W 68/005; H04W 68/025; H04W 52/0216; H04W 52/0219; Y02D 30/70
(Continued)

(56) References Cited

U.S. PATENT DOCUMENTS

2020/0163048 A1*   5/2020   Kim ...................... H04W 72/12
2020/0404617 A1*  12/2020   Murray ............. H04W 52/0229
(Continued)

FOREIGN PATENT DOCUMENTS

CN    105898867 A    8/2016
JP    2019503127 A    1/2019

OTHER PUBLICATIONS

CMCC; Discussion on paging enhancement; 3GPP TSG RAN WG1 #102-e R1-2006221; e-Meeting, Aug. 17-28, 2020; 5 pages (Year: 2020).*
(Continued)

*Primary Examiner* — Hirdepal Singh
(74) *Attorney, Agent, or Firm* — Seed Intellectual Property Law Group LLP

(57) ABSTRACT

The present disclosure relates to a user equipment (UE), comprising the following. A processor of the UE operates a paging function that includes monitoring of a downlink control channel for receiving a paging downlink control information, DCI, and includes receiving of a paging message, the paging DCI and the paging message being transmitted from a base station. A receiver of the UE receives paging sub-group signalling from the base station. The processor determines a paging sub-group index based on the received paging sub-group signalling. The processor determines how to operate the paging function based on whether or not the determined paging sub-group index fulfils a requirement that involves an identification of the UE.

17 Claims, 8 Drawing Sheets

(58) Field of Classification Search
USPC .......................................................... 455/458
See application file for complete search history.

(56) References Cited

U.S. PATENT DOCUMENTS

2022/0046582 A1* 2/2022 Shrivastava .......... H04W 68/02
2023/0043139 A1* 2/2023 Hwang ............. H04W 52/0229

OTHER PUBLICATIONS

3GPP TR 38.913 V15.0.0, "3rd Generation Partnership Project; Technical Specification Group Radio Access Network; Study on Scenarios and Requirements for Next Generation Access Technologies; (Release 15)," Jun. 2018. (39 pages).

3GPP TS 23.501 V16.5.1, "3rd Generation Partnership Project; Technical Specification Group Services and System Aspects; System architecture for the 5G System (5GS); Stage 2 (Release 16)," Aug. 2020. (440 pages).

3GPP TS 38.211 V16.2.0, "3rd Generation Partnership Project; Technical Specification Group Radio Access Network; NR; Physical channels and modulation (Release 16)," Jun. 2020. (131 pages).

3GPP TS 38.212 V16.3.0, "3rd Generation Partnership Project; Technical Specification Group Radio Access Network; NR; Multiplexing and channel coding (Release 16)," Sep. 2020. (152 pages).

3GPP TS 38.213 V16.3.0, "3rd Generation Partnership Project; Technical Specification Group Radio Access Network; NR; Physical layer procedures for control (Release 16)," Sep. 2020. (179 pages).

3GPP TS 38.214 V16.3.0, "3rd Generation Partnership Project; Technical Specification Group Radio Access Network; NR; Physical layer procedures for data (Release 16)," Sep. 2020. (166 pages).

3GPP TS 38.300 V16.0.0, "3rd Generation Partnership Project; Technical Specification Group Radio Access Network; NR; NR and NG-RAN Overall Description; Stage 2 (Release 16)," Dec. 2019. (101 pages).

3GPP TS 38.300 V16.2.0, "3rd Generation Partnership Project; Technical Specification Group Radio Access Network; NR; NR and NG-RAN Overall Description; Stage 2 (Release 16)," Jul. 2020. (148 pages).

3GPP TS 38.304 V16.2.0, "3rd Generation Partnership Project; Technical Specification Group Radio Access Network; NR; User Equipment (UE) procedures in Idle mode and RRC Inactive state (Release 16)," Sep. 2020. (39 pages).

3GPP TS 38.321 V16.1.0, "3rd Generation Partnership Project; Technical Specification Group Radio Access Network; NR; Medium Access Control (MAC) protocol specification (Release 16)," Jul. 2020. (151 pages).

3GPP TS 38.331 V16.1.0, "3rd Generation Partnership Project; Technical Specification Group Radio Access Network; NR; Radio Resource Control (RRC) protocol specification (Release 16)," Jul. 2020. (906 pages).

CMCC, "Discussion on paging enhancement," R1-2006221, Agenda item: 8.7.1.1, 3GPP TSG RAN WG1 #102-e, e-Meeting, Aug. 17-28, 2020. (5 pages).

Extended European Search Report, dated Apr. 26, 2021, for European Patent Application No. 20202146.5. (25 pages).

International Search Report, mailed March 3, 2022m for International Patent Application No. PCT/EP2021/075364. (7 pages).

ITU, "IMT Vision—Framework and overall objectives of the future development of IMT for 2020 and beyond," Recommendation ITU-R M.2083-0, Sep. 2015. (21 pages).

LG Electronics, "Discussion on potential paging enhancements," R1-2006311, Agenda Item: 8.7.1.1, 3GPP TSG RAN WG1 #102-e, e-Meeting, Aug. 17-28, 2020. (3 pages).

Vivo, "Discussion on paging enhancements for idle/inactive mode UE power saving," R1-2005388, Agenda Item: 8.7.1.1, 3GPP TSG RAN WG1#102-e, e-Meeting, Aug. 17-28, 2020. (8 pages).

Xiaomi, "Discussion on TRS/CSI-RS occasions for idle/inactive UEs," R1-2005739, Agenda item: 8.7.1.2, 3GPP TSG RAN WG1 #102, e-Meeting, Aug. 17-28, 2020. (2 pages).

Huawei, HiSilicon, "Paging enhancement(s) for UE power saving in IDLE/inactive mode," R1-2005262, Agenda Item: 8.7.1.1, 3GPP TSG RAN WG1 Meeting #102-e, E-meeting, Aug. 17-28, 2020. (11 pages).

* cited by examiner

USER EQUIPMENT AND BASE STATION INVOLVED IN PAGING

BACKGROUND

Technical Field

The present disclosure is directed to methods, devices and articles in communication systems, such as 3GPP communication systems.

Description of the Related Art

Currently, the 3rd Generation Partnership Project (3GPP) works at the technical specifications for the next generation cellular technology, which is also called fifth generation (5G).

One objective is to provide a single technical framework addressing all usage scenarios, requirements and deployment scenarios (see, e.g., section 6 of TR 38.913 version 15.0.0), at least including enhanced mobile broadband (eMBB), ultra-reliable low-latency communications (URLLC), and massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC deployment scenarios may include scenarios with large number of devices with non-time critical data transfers such as smart wearables and sensor networks. The services eMBB and URLLC are similar in that they both demand a very broad bandwidth, however are different in that the URLLC service may preferably require ultra-low latencies.

A second objective is to achieve forward compatibility. Backward compatibility to Long Term Evolution (LTE, LTE-A) cellular systems is not required, which facilitates a completely new system design and/or the introduction of novel features.

BRIEF SUMMARY

One non-limiting and exemplary embodiment facilitates providing procedures for facilitating a UE to perform a paging function.

In an embodiment, the techniques disclosed here feature a user equipment comprising the following. A processor of the UE operates a paging function that includes monitoring of a downlink control channel for receiving a paging downlink control information, DCI, and includes receiving of a paging message, the paging DCI and the paging message being transmitted from a base station. A receiver of the UE receives paging sub-group signalling from the base station. The processor determines a paging sub-group index based on the received paging sub-group signalling. The processor determines how to operate the paging function based on whether or not the determined paging sub-group index fulfils a requirement that involves an identification of the UE.

It should be noted that general or specific embodiments may be implemented as a system, a method, an integrated circuit, a computer program, a storage medium, or any selective combination thereof. For instance, an integrated circuit can control a process of a UE or base station.

Additional benefits and advantages of the disclosed embodiments and different implementations will be apparent from the specification and figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

DETAILED DESCRIPTION

5G NR System Architecture and Protocol Stacks

3GPP has been working at the next release for the 5$^{th}$ generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
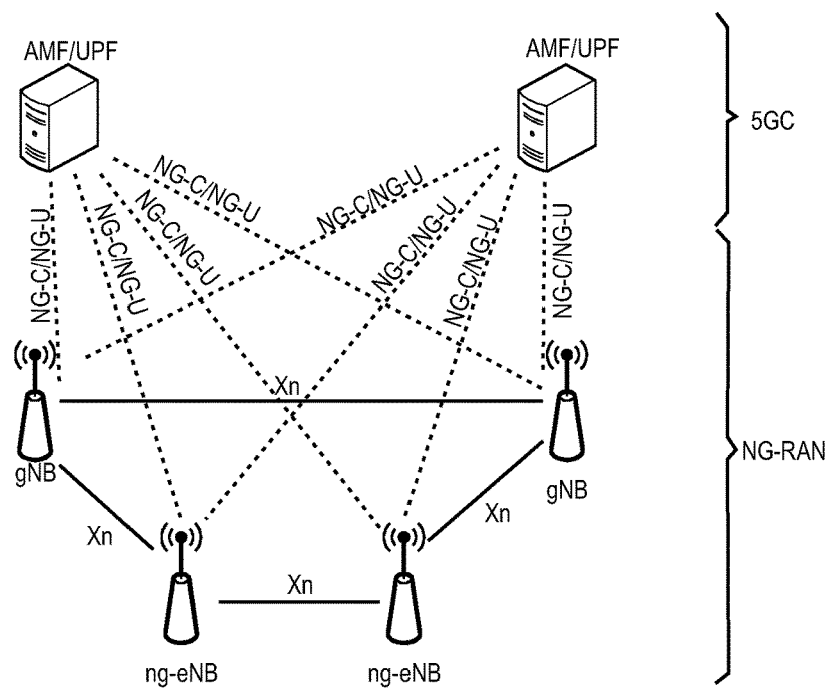
FIG. 1 shows an exemplary architecture for a 3GPP NR system.

Among other things, the overall system architecture assumes an NG-RAN (Next Generation-Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v16.2.0, section 4).

The user plane protocol stack for NR (see, e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the RRC layer are listed in sub-clause 7 of TS 38.300.

For instance, the Medium-Access--Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH (Physical Uplink Shared Channel) and PUCCH (Physical Uplink Control Channel) for uplink and PDCCH (Physical Downlink Shared Channel), PDCCH (Physical Downlink Control Channel) and PBCH (Physical Broadcast Channel) for downlink.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and. DL each for user plane latency) and high reliability (1-10$^{-5}$ within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v16.2.0, e.g., section 4). For instance, downlink and uplink transmissions are organized into frames with 10 ms duration, each frame consisting of ten subframes of respectively 1 ms duration. In 5g NR implementations the number of consecutive OFDM symbols per subframe depends on the subcarrier-spacing configuration. For example, for a 15-kHz subcarrier spacing, a subframe has 14 OFDM symbols (similar to an LTE-conformant implementation, assuming a normal cyclic prefix). On the other hand, for a 30-kHz subcarrier spacing, a subframe has two slots, each slot comprising 14 OFDM symbols.

5G NR Functional Split Between NG-RAN and 5GC

Figure 2:
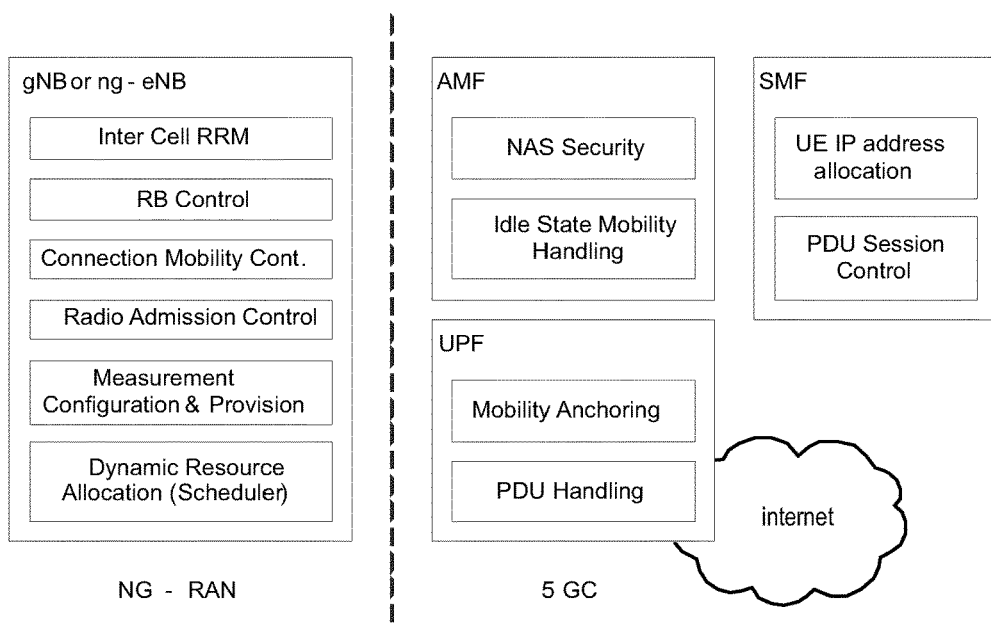
FIG. 2 is a schematic drawing that shows a functional split between NG-RAN and 5GC.

FIG. 2 illustrates functional split between NG-RAN and 5GC. NG-RAN logical node is a gNB or ng-eNB. The 5GC has logical nodes AMP, UPF and SMF.

In particular, the gNB and ng-eNB host the following main functions:

Functions for Radio Resource Management such as Radio Bearer Control, Radio Admission Control, Connection Mobility Control, Dynamic allocation of resources to UEs in both uplink and downlink (scheduling);

IP header compression, encryption and integrity protection of data;

Selection of an AMF at UE attachment when no routing to an AMP can be determined from the information provided by the UE;

Routing of User Plane data towards UPF(s);

Routing of Control Plane information towards AMF;

Connection setup and release;

Scheduling and transmission of paging messages;

Scheduling and transmission of system broadcast information (originated from the AMP or OAM);

Measurement and measurement reporting configuration for mobility and scheduling;
Transport level packet marking in the uplink;
Session Management;
Support of Network Slicing;
QoS Flow management and mapping to data radio bearers;
Support of UEs in RRC_INACTIVE state;
Distribution function for NAS messages;
Radio access network sharing;
Dual Connectivity; and
Tight interworking between NR and E-UTRA.

The Access and Mobility Management Function (AMF) hosts the following main functions:
Non-Access Stratum, NAS, signalling termination;
NAS signalling security;
Access Stratum, AS, Security control;
Inter Core Network, CN, node signalling for mobility between 3GPP access networks;
Idle mode UE Reachability (including control and execution of paging retransmission);
Registration Area management;
Support of intra-system and inter-system mobility;
Access Authentication;
Access Authorization including check of roaming rights;
Mobility management control (subscription and policies);
Support of Network Slicing; and
Session Management Function, SMF, selection.

Furthermore, the User Plane Function, UPF, hosts the following main functions:
Anchor point for Intra-/inter-RAT mobility (when applicable);
External PDU session point of interconnect to Data Network;
Packet routing & forwarding;
Packet inspection and User plane part of Policy rule enforcement;
Traffic usage reporting;
Uplink classifier to support routing traffic flows to a data network;
Branching point to support multi-homed PDU session;
QoS handling for user plane, e.g., packet filtering, gating, UL/DL rate enforcement;
Uplink Traffic verification (SDF to QoS flow mapping);
Downlink packet buffering and downlink data notification triggering.

Finally, the Session Management function, SMF, hosts the following main functions:
Session Management;
UE IP address allocation and management;
Selection and control of UP function;
Configures traffic steering at User Plane Function, UPF, to route traffic to proper destination;
Control part of policy enforcement and QoS; and
Downlink Data Notification.

RRC Connection Setup and Reconfiguration Procedures

Figure 3:
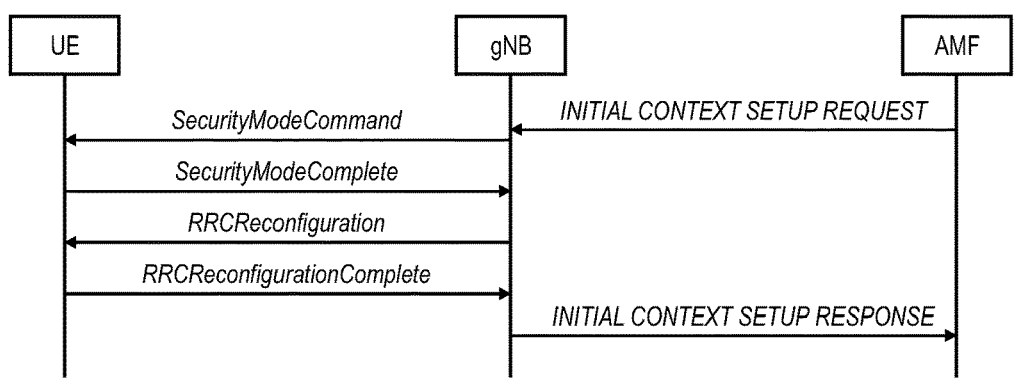
FIG. 3 is a sequence diagram for RRC connection setup/reconfiguration procedures.

FIG. 3 illustrates some interactions between a UE, gNB, and AMF (a 5GC entity) in the context of a transition of the UE from RRC_IDLE to RRC_CONNECTED for the NAS part (see TS 38.300).

RRC is a higher layer signaling (protocol) used for UE and gNB configuration. In particular, this transition involves that the AMF prepares the UE context data (including, e.g., PDU session context, the Security Key, UE Radio Capability and UE Security Capabilities, etc.) and sends it to the gNB with the CONTEXT SETUP REQUEST. Then, the gNB activates the AS security with the UE, which is performed by the gNB transmitting to the UE a. SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signalling-only connection, the steps relating to the RRCReconfiguration are skipped since SRB2 and DRBs are not setup. Finally, the gNB informs the AME that the setup procedure is completed with the INITIAL, CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element (IE) to the UE via the signaling radio hearer. The UE then performs an uplink transmission or a downlink reception based on the resource allocation configuration.

Usage Scenarios of IMT for 2020 and Beyond

Figure 4:
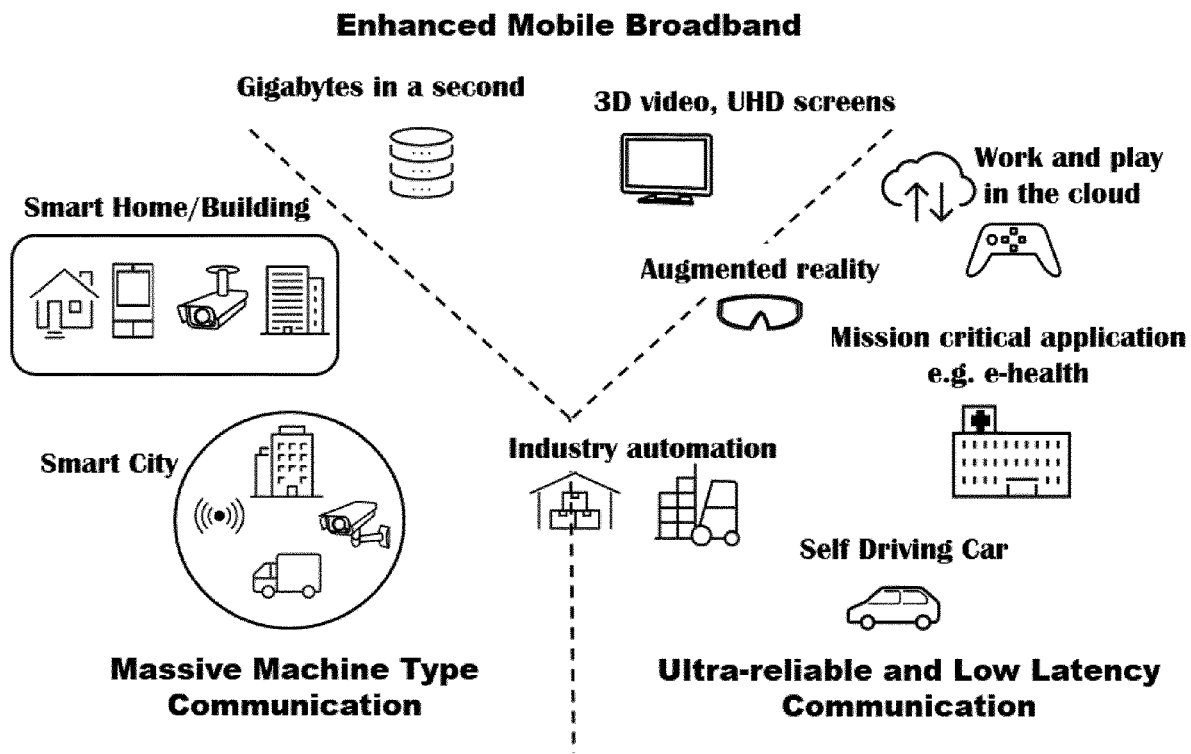
FIG. 4 is a schematic drawing showing usage scenarios of Enhanced mobile broadband (eMBB), Massive Machine Type Communications (mMTC) and Ultra Reliable and Low Latency Communications (URLLC)

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see, e.g., ITU-R M.2083 FIG. 2).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913 version 15.0.0. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to $10^6$ level), higher availability, packet sizes of up to 256 bytes, time synchronization down to the order of a few us where the value can be one or a few its depending on frequency range and short latency in the order of 0.5 to 1 ms in particular a target user plane latency of 0.5 ms, depending on the use cases.

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also, PUSCH enhancements related to mini-slot level hopping and retransmission/repetition enhancements have been identified. The term "mini-slot" refers to a Transmission Time interval (TTI) including a smaller number of symbols than a slot (a slot comprising fourteen symbols).

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g., as shown above with reference to FIG. 3. The NO-RAN maps packets belonging to different PDU sessions to different DRBs. NAS level packet filters in the UE and in the 5GC associate UL and DL packets with QoS Flows, whereas AS-level mapping rules in the UE and in the NO-RAN associate UL and DL QoS Flows with DRBs.

Figure 5:
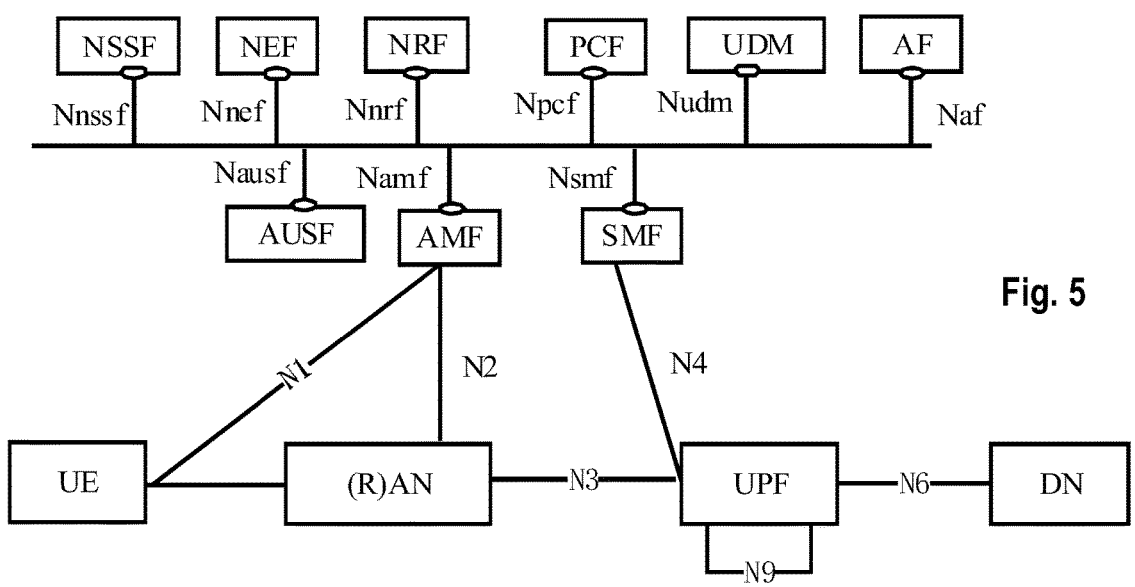
FIG. 5 is a block diagram showing an exemplary 5G system architecture for a non-roaming scenario.

FIG. 5 illustrates a 5G NR non-roaming reference architecture (see TS 23.501 v16.5.1, section 4.2.3). An Application Function (AF), e.g., an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions, Application Functions not allowed by the operator to access directly the Network Functions use the external exposure framework via the NEF to interact with relevant Network Functions.

FIG. 5 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services. All of or a part of the core network functions and the application services may be deployed and running on cloud computing environments.

In the present disclosure, thus, an application server (for example, AF of the 5G architecture), is provided that comprises a transmitter, which, in operation, transmits a request containing a QoS requirement for at least one of URLLC, eMBB and mMTC services to at least one of functions (for example NEF, AMF, SMF, PCF, UPF, etc.) of the 5GC to establish a PDU session including a radio bearer between a gNodeB and a UE in accordance with the QoS requirement and control circuitry, which, in operation, performs the services using the established PDU session.

UE Identifications

RNTI stands for Radio Network Temporary Identifier. For instance, an RNTI can used to differentiate and identify a UE in the radio cell. Further, an RNTI can also identify a specific radio channel, a group of UEs in case of paging, a group of UEs for which power control is issued by the eNB, system information transmitted for all the UEs by 5G gNB. 5G NR defines numerous different identifications for the UE, sonic of which are presented in the following table (see 3GPP TS 38.321 v16.1.0, section 7.1).

TABLE

RNTI values.

| Value (hexadecimal) | RNTI |
|---|---|
| 0000 | N/A |
| 0001-FFF2 | RA-RNTI, MSGB-RNTI, Temporary C-RNTI, C-RNTI, CI-RNTI, MCS-C-RNTI, CS-RNTI, TPC-PUCCH-RNTI, TPC-PUSCH-RNTI, TPC-SRS-RNTI, INT-RNTI, SFI-RNTI, SP-CSI-RNTI, PS-RNTI, SL-RNTI, SLCS-RNTI SL Semi-Persistent Scheduling V-RNTI, and AI-RNTI |
| FFF3-FFFD | Reserved |
| FFFE | P-RNTI |
| FFFF | SI-RNTI |

TABLE

RNTI usage

| RNTI | Usage | Transport Channel | Logical Channel |
|---|---|---|---|
| P-RNTI | Paging and System Information change notification | PCH | PCCH |
| SI-RNTI | Broadcast of System Information | DL-SCH | BCCH |
| RA-RNTI | Random Access Response | DL-SCH | N/A |
| Temporary C-RNTI | Contention Resolution (when no valid C-RNTI is available) | DL-SCH | CCCH, DCCH |
| Temporary C-RNTI | Msg3 transmission | UL-SCH | CCCH, DCCH, DTCH |
| C-RNTI, MCS-C-RNTI | Dynamically scheduled unicast transmission | UL-SCH | DCCH, DTCH |
| C-RNTI | Dynamically scheduled unicast transmission | DL-SCH | CCCH, DCCH, DTCH |
| MCS-C-RNTI | Dynamically scheduled unicast transmission | DL-SCH | DCCH, DTCH |
| C-RNTI | Triggering of PDCCH ordered random access | N/A | N/A |
| CS-RNTI | Configured scheduled unicast transmission (activation, reactivation and retransmission) | DL-SCH, UL-SCH | DCCH, DTCH |
| CS-RNTI | Configured scheduled unicast transmission (deactivation) | N/A | N/A |
| TPC-PUCCH-RNTI | PUCCH power control | N/A | N/A |
| TPC-PUSCH-RNTI | PUSCH power control | N/A | N/A |
| TPC-SRS-RNTI | SRS trigger and power control | N/A | N/A |
| INT-RNTI | Indication pre-emption in DL | N/A | N/A |
| SFI-RNTI | Slot Format Indication on the given cell | N/A | N/A |
| SP-CSI-RNTI | Activation of Semi-persistent CSI reporting on PUSCH | N/A | N/A |

NOTE:
The usage of MCS-C-RNTI is equivalent to that of C-RNTI in MAC procedures (except for the C-RNTI MAC CE).

Another UE identification that can be used, for example in connection with paging, is UE_ID: 5G-S-TMSI mod 1024.

RRC States (RRC Connected, RRC Inactive)

In a LTE, the RRC state machine consisted of only two states, the RRC idle state (mainly characterized by high power savings, UE autonomous mobility and no established UE connectivity towards the core network) and the RRC connected state in which the UE can transmit user plane data while mobility is network-controlled to support lossless service continuity. In connection with 5G NR, the LTE-related RRC state machine is extended with an inactive state (see, e.g., TS 38.331 v16.1,0, FIGS. 4.2.1-1 and 4,2.1-2), as explained in the following.

Figure 6:
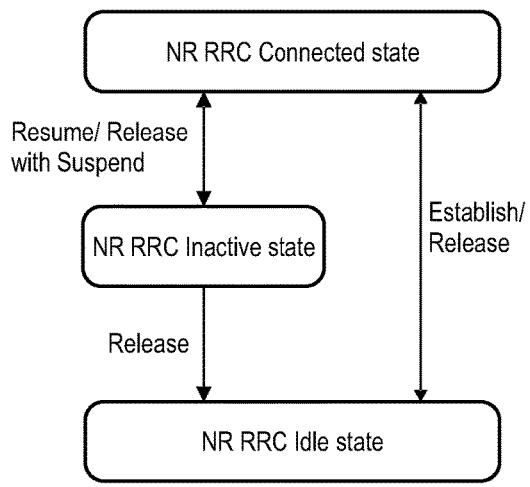
FIG. 6 illustrates the possible RRC state changes.

The RRC in NR 5G (see TS 38.331, section 4) supports the following three states, RRC Idle, RRC Inactive, and RRC Connected. A UE is either in RRC_CONNECTED state or in RRC_INACTIVE state when an RRC connection has been established. If this is not the case, i.e., no RRC connection is established, the UE is in RRC_IDLE state. The following state transitions are possible as illustrated in FIG. 6:

from RRC_IDLE to RRC_CONNECTED, following, e.g., the "connection establishment" procedure;

from RRC_CONNECTED to RRC_IDLE, following, e.g., the "connection release" procedure;

from RRC_CONNECTED to RRC_INACTIVE, following, e.g., the connection release with suspend procedure;

from RRC_INACTIVE to RRC_CONNECTED, following, e.g., the connection resume procedure; and from RRC_INACTIVE to RRC_IDLE(uni-directional), following, e.g., the "connection release" procedure.

The new RRC state, RRC Inactive, is defined for the new radio technology of 5G 3GPI), sn as to provide benefits when supporting a wider range of services such as the eMBB (enhanced Mobile Broadband), mMTC (massive Machine Type Communications) and URLLC (Ultra-Reliable and Low-Latency Communications) which have very different requirements in terms of signalling, power saving, latency, etc. The new RRC Inactive state shall thus be designed to allow minimizing signaling, power consumption and resource costs in the radio access network and core network while still allowing, e.g., to start data transfer with low delay.

According to an exemplary 5G NR implementation, the different states are characterized as follows (see section 4.2.1 of TS 38.331):

"RRC_IDLE:

A UE specific DRX may be configured by upper layers;
UE controlled mobility based on network configuration;
The UE:
  Monitors Short Messages transmitted with P-RNTI over DCI (see clause 6.5);
  Monitors a Paging channel for CN paging using 5G-S-TMSI;
  Performs neighbouring cell measurements and cell (re-)selection:
  Acquires system information and can send SI request (if configured).
  Performs logging of available measurements together with location and time far logged measurement configured UEs.

RRC_INACTIVE:

A UE specific DRX may be configured y upper layers or by RRC layer;
UE controlled mobility based on network configuration;
The UE stores the UE Inactive AS context;
A RAN-based notification area is configured by RRC layer; The UE:
  Monitors Short Messages transmitted P-RNTI over DCI (see clause 6.5);
  Monitors a Paging channel for CN paging using 5G-S-TMSI and RAN paging using fulI1-RNTI;
  Performs neighbouring cell measurements and cell (re-)selection;

Performs RAN-based notification area updates periodically and when moving outside the configured RAN-based notification area;

Acquires system information and can send SI request (if configured).

Performs logging of available measurements together with location and time for logged measurement configured UEs.

RRC_CONNECTED:

The UE stores the AS context;

Transfer of unicast data to/from UE;

At lower layers, the UE may be configured with a UE specific DRX;

For UEs supporting CA, use of one or more SCells, aggregated with the SpCell, for increased bandwidth;

For UEs supporting DC, use of one SCG, aggregated with the MCG, for increased bandwidth;

Network controlled mobility within NR and to/from E-UTRA;

The UE:

Monitors Short Messages transmitted with P-RNTI over DCI (see clause 6.5), if configured;

Monitors control channels associated with the shared data channel to determine if data is scheduled for it;

Provides channel quality and feedback information;

Performs neighbouring cell measurements and measurement reporting;

Acquires system information;

Performs immediate MDT measurement together with available location reporting."

According to the characteristics of the RRC Inactive state, for the Inactive UE the connection (both for user plane and control plane) is maintained with RAN and the core network. More specifically, in RRC Inactive, although the connection still exists, it is suspended, or put differently the connection is not active anymore. On the other hand, in RRC Connected state, the connection exists and is active, e.g., in the sense that it is used for a data transmission. In RRC Idle state, the UE has no RRC connection with the RAN and the core network, which also means that, e.g., the radio base station does not have any context of the UE and, e.g., does not know the identification of the UE and does not have security parameters relating to the UE to be able to properly decode data transmitted by the UE (security, e.g., ensures integrity of the transmitted data). UE context may he available in the core network, but would have to be fetched first by the radio base station.

In addition, the paging mechanism (may also be called, e.g., notification mechanism) for user equipments in the radio cell is based on so called radio access network, RAN,-based notification areas (in short RNAs). The radio access network should be aware of the current RNA the user equipment is located in, and the user equipment may assist the gNB to track the LIE moving among various RNAs. The RNA can be UE-specific.

Synchronization Signal Block Measurement Timing Configuration—SMTC—PSS/SSS, PBCH NR has introduced the so-called synchronization signal block, SS block (SSB), which comprises a Primary Synchronization Signal (PSS), a Secondary Synchronization Signal (SSS), and a Physical Broadcast CHannel (PBCH). The. PSS and SSS can be used by UES to find, synchronize to and identify a network. The PBCH carries a minimum amount of system information including an indication wThere the remaining broadcast system information is transmitted.

In LTE, these three signals were also used, the PSS, SSS, and PBCH, although not as being part of one SSB. The three SSB components are always transmitted together in NR, e.g., they have the same periodicity. A given SSB may he repeated within an SS burst set, which can be potentially used for a gNB beam-sweeping transmission. The SS burst set may be confined to a particular time period, such as a 5 ms window. For initial cell selection, the UE may assume a default SS burst set periodicity of 20 ms.

The 5G NR PSS is a Physical Layer specific signal to identify the radio frame boundary and is type of an m-sequence. The 5G NR SSS is also a Physical-Layer specific signal to identify the subframe boundary and is also an m-sequence (see, e.g., TS 38.211 v16.2.0 sections 7.4.2 and 7.4.3).

According to one exemplary 5G-compliant implementation, the sequence generation for the SSS sequence is defined as follows (see TS 38.211, section 7.4.2.3.1):

The sequence $d_{SSS}(n)$ for the secondary synchronization signal is defined by $$d_{sss}(n) = [1 - 2x_0((n + m_0)\bmod 127)][1 - 2x_1((n + m_1)\bmod 127)]$$

$$m_0 = 15\left\lfloor \frac{N_{ID}^{(1)}}{112} \right\rfloor + 5N_{ID}^{(2)}$$

$$m_1 = N_{ID}^{(1)} \bmod 112$$

$$0 \le n < 127 \text{ where}$$

$$x_0(i + 7) = (x_0(i + 4) + x_0(i)) \bmod 2$$

$$x_1(i + 7) = (x_1(i + 4) + x_1(i)) \bmod 2 \text{ and}$$

$$[x_0(6)\ x_0(5)\ x_0(4)\ x_0(3)\ x_0(2)\ x_0(1)\ x_0(0)] = [0\ 0\ 0\ 0\ 0\ 0\ 1]$$

$$[x_1(6)\ x_1(5)\ x_1(4)\ x_1(3)\ x_1(2)\ x_1(1)\ x_1(0)] = [0\ 0\ 0\ 0\ 0\ 0\ 1]$$

The time-frequency structure of an SS/PBCH block, carrying the SSS is described in the following (e.g., see TS 38.211 section 7.4.3.1). In the time domain, an SS/PBCH block consists of 4 OFDM symbols, where the SSS is mapped to sygibols as given by the following table. In the frequency domain, an SS/PBCH block consists of 140 contiguous subcarriers. The quantities k and l represent the frequency and time indices, respectively, within one SS/PBCH block.

| Channel or signal | OFDM symbol number l relative to the start of an SS/PBCH block | Subcarrier number k relative to the start of an SS/PBCH block |
|---|---|---|
| SSS | 2 | 56, 57, . . . , 182 |

Reference Signals, CSI-RS

Several different types of reference signals (RS) are used for 5G NR (see 3GPP TS 38.211 v16.2.0 section 7.4.1). At least the following reference signals are available in 5G NR:

CSI-RS, Channel State Information Reference Signal, usable for channel state information acquisition and beam management PDSCH DMRS, DeModulation Reference Signal, usable for the PDSCH demodulation PDCCH DMRS, DeModulation Reference Signal, usable for the PDSCH demodulation PBCH DMRS, DeModulation Reference Signal, usable for the PBCH demodulation PTRS, Phase Tracking Reference Signal, usable for phase tracking the PDSCH,
Tracking Reference Signal, usable for time tracking
RIM reference signals
Positioning reference signals As a DL-only signal, the CSI-RS, which the UE receives, can be used by the UE to estimate the channel and to report channel quality information back to the gNB (assists the gNB in modulation coding scheme selection, resource allocation, beamforming, MIMO rank selection). The CSI-RS can be configured for periodic, aperiodic (e.g., DCI triggered), or semi-persistent transmission with a configuration density by the gNB. The CSI-RS also can be used for interference measurement (IM) and fine frequency/time tracking purposes. Specific instances of CSI-RS can be configured for time/frequency tracking and mobility measurements. During MIMO operations, NR may use different antenna approaches based on the carrier frequency. At lower frequencies, the system uses a modest number of active antennas for MU-MIMO and adds FDD operations. In this case, the UE may use the CSI-RS to calculate the CSI and report it back in the UL direction.

separately configured for multiple devices, which means that a single CSI-RS can be shared among multiple devices.

For instance, a single-port CSI-RS occupies a single resource element within a resource block in the frequency domain and one slot in the time domain. While the CSI-RS can be configured to occur anywhere in the resource block, in practice it is possible to impose some restrictions on the CSI-RS resource assignment so as to avoid collisions with other downlink physical channels and signals. As an example, the transmission of a configured CSI-RS can be such that it does not collide with a CORESET configured for the device, the DM-RS associated with the PDSCH transmissions and the SS block transmissions.

The 5G NR standard supports flexible CSI-RS configurations. In the time domain, the CSI-RS resource may start at any OFDM symbol of a slot and span 1, 2, or 4 OFDM symbols, e.g., depending on the number of configured antenna ports.

An exemplarily CSI-RS configuration according to a 5G-NR compliant configuration in line with TS 38.211 v16.2.0, section 7.4.1.5 is based on the following Table.

Table: CSI-RS Locations Within a Slot

| Row | Ports X | Density ρ | cdm-Type | $(\bar{k}, \bar{l})$ | CDM group index j | k' | l' |
|---|---|---|---|---|---|---|---|
| 1 | 1 | 3 | noCDM | $(k_0, l_0), (k_0 + 4, l_0),$ $(k_0 + 8, l_0)$ | 0, 0, 0 | 0 | 0 |
| 2 | 1 | 1, 0.5 | noCDM | $(k_0, l_0),$ | 0 | 0 | 0 |
| 3 | 2 | 1, 0.5 | fd-CDM2 | $(k_0, l_0),$ | 0 | 0, 1 | 0 |
| 4 | 4 | 1 | fd-CDM2 | $(k_0, l_0), (k_0 + 2, l_0)$ | 0, 1 | 0, 1 | 0 |
| 5 | 4 | 1 | fd-CDM2 | $(k_0, l_0), (k_0, l_0 + 1)$ | 0, 1 | 0, 1 | 0 |
| 6 | 8 | 1 | fd-CDM2 | $(k_0, l_0), (k_1, l_0),$ $(k_2, l_0), (k_3, l_0)$ | 0, 1, 2, 3 | 0, 1 | 0 |
| 7 | 8 | 1 | fd-CDM2 | $(k_0, l_0), (k_1, l_0), (k_0,$ $l_0 + 1), (k_1, l_0 + 1)$ | 0, 1, 2, 3 | 0, 1 | 0 |
| 8 | 8 | 1 | cdm4-FD2-TD2 | $(k_0, l_0), (k_1, l_0)$ | 0, 1 | 0, 1 | 0, 1 |
| 9 | 12 | 1 | fd-CDM2 | $(k_0, l_0), (k_1, l_0), (k_2, l_0),$ $(k_3, l_0), (k_4, l_0), (k_5, l_0)$ | 0, 1, 2, 3, 4, 5 | 0, 1 | 0 |
| 10 | 12 | 1 | cdm4-FD2-TD2 | $(k_0, l_0), (k_1, l_0), (k_2, l_0)$ | 0, 1, 2 | 0, 1 | 0, 1 |
| 11 | 16 | 1, 0.5 | fd-CDM2 | $(k_0, l_0), (k_1, l_0), (k_2, l_0),$ $(k_3, l_0), (k_0, l_0 + 1), (k_1,$ $l_0 + 1), (k_2, l_0 + 1), (k_3,$ $l_0 + 1)$ | 0, 1, 2, 3, 4, 5, 6, 7 | 0, 1 | 0 |
| 12 | 16 | 1, 0.5 | cdm4-FD2-TD2 | $(k_0, l_0), (k_1, l_0), (k_2, l_0),$ $(k_3, l_0)$ | 0, 1, 2, 3 | 0, 1 | 0, 1 |
| 13 | 24 | 1, 0.5 | fd-CDM2 | $(k_0, l_0), (k_1, l_0), (k_2, l_0),$ $(k_0, l_0 + 1), (k1, l_0 + 1),$ $(k_2, l_0 + 1), (k_0, l_1), (k_1,$ $l_1), (k_2, l_1), (k_0, l_1 + 1),$ $(k_1, l_1 + 1), (k_2, l_1 + 1)$ | 0, 1, 2, 3, 4, 5, 6, 7, 8, 9, 10, 11 | 0, 1 | 0 |
| 14 | 24 | 1, 0.5 | cdm4-FD2-TD2 | $(k_0, l_0), (k_1, l_0), (k_2, l_0),$ $(k_0, l_1), (k_1, l_1), (k_2, l_2)$ | 0, 1, 2, 3, 4, 5 | 0, 1 | 0, 1 |
| 15 | 24 | 1, 0.5 | cdm8-FD2-TD4 | $(k_0, l_0), (k_1, l_0), (k_2, l_0)$ | 0, 1, 2 | 0, 1 | 0, 1, 2, 3 |
| 16 | 32 | 1, 0.5 | fd-CDM2 | $(k_0, l_0), (k_1, l_0), (k_2, l_0),$ $(k_3, l_0), (k_0, l_0 + 1), (k_1,$ $l_0 + 1), (k_2, l_0 + 1), (k_3,$ $l_0 + 1), (k_0, l_1), (k_1, l_1),$ $(k_2, l_1), (k_3, l_1), (k_0, l_1 +$ $1), (k_1, l_1 + 1), (k_2, l_1 +$ $1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | cdm4-FD2-TD2 | $(k_0, l_0), (k_1, l_0), (k_2, l_0),$ $(k_3, l_0), (k_0, l_1), (k_1, l_1),$ $(k_2, l_1), (k_3, l_1)$ | 0, 1, 2, 3, 4, 5, 6, 7 | 0, 1 | 0, 1 |
| 18 | 32 | 1, 0.5 | cdm8-FD2-TD4 | $(k_0, l_0), (k_1, l_0), (k_2, l_0),$ $(k_3, l_0)$ | 0, 1, 2, 3 | 0, 1 | 0, 1, 2, 3 |

The CSI-RS is UE-specific; nonetheless, multiple users can share the same CSI-RS resource. In particular, a UE-specific configuration of a CSI-RS does not necessarily mean that a transmitted CSI-RS can only be used by a single device, rather the same set of CSI-RS resources can be The resource elements $(k, l)_{p,\mu}$ for the CSI-RS are termined according to the above.

Furthermore, the respective resource elements carry the reference-signal sequence r(m). According to one exemplary 5G-compliant implementation, the sequence generation for the CSI-RS sequence is defined as follows (see TS 38.211 section 7.4.1.5.2):

The UE shall assume the reference-signal sequence r(m) is defined by $$r(m) = \frac{1}{\sqrt{2}}(1 - 2 \cdot c(2m)) + j\frac{1}{\sqrt{2}}(1 - 2 \cdot c(2m+1))$$

where the pseudo-random sequence c(i) is defined in clause 5.2.1. The pseudo-random sequence generator shall be initialized with $$c_{init}=(2^{10}(N_{symb}^{slot}n_{s,f}^{\mu}+l+1)(2n_{ID}+1)+n_{ID}) \bmod 2^{31}$$

at the start of each OFDM symbol where $n_{s,f}^{\mu}$ is the slot number within a radio frame, l is the OFDM symbol number within a slot, and $n_{ID}$ equals the higher-layer parameter scramblingID or sequenceGenerationConfig.

Paging Procedures in 5G NR

An exemplary implementation of the paging function in 5G NR that involves PDCCH monitoring, according to the currently standardized version, will be explained in a simplified and abbreviated form in the following.

There are two different paging procedures in 5G NR, a RAN-based paging procedure (e.g., based on RAN-based notification areas) and a core-network-based paging procedure (see for instance 3GPP TS 38.300 v16.0.0, TS 38.304 v16.2.0, and TS 38.331 v16.1.0 referring to RAN paging and CN paging in several sections thereof, such as section 5.3.2 "Paging" in TS 38.331 or section 9.2.5 "Paging" in TS 38.300).

Paging allows the network to reach UEs in RRC_IDLE and RRC_INACTIVE state through Paging messages, and to notify UEs in RRC_IDLE, RRC_INACTIVE, and RRC_CONNECTED state of system information change and public warning information (such as ETWS/CMAS, Earthquake and Tsunami Warning System( Commercial Mobile Alert System) indications through Short Messages. Both the paging messages and the Short Messages are addressed to the P-RNTI on the PDCCH (e.g., using the DCI_format 1_0) to be monitored by the UE. But while the actual paging messages (e.g., with the paging records) are then sent in a message on the PDSCH (as indicated by the PDCCH), the Short Messages can be sent over PDCCH directly.

While in RRC_IDLE the UE monitors the paging channels for CN-initiated paging, and in RRC_INACTIVE the UE also monitors paging channels for RAN-initiated paging. As defined in TS 38.331 section 5.3.2, the network initiates the paging procedure by transmitting the paging message at the UE's paging occasion (see, e.g., TS 38.304 -v16.2.0). The network may address multiple UEs within a paging message by including one Paging Record for each UE.

The following exemplary paging message is defined in TS 38.331:

The Paging message is used for the notification of one or more UEs.

Signalling radio bearer: N/A
RLC-SAP: TM
Logical channel: PCCH
Direction: Network to UE

```
-- ASN1START
-- TAG-PAGING-START
Paging ::=                    SEQUENCE {
    pagingRecordList              PagingRecordList        OPTIONAL, -- Need N
    lateNonCriticalExtension      OCTET STRING            OPTIONAL,
    nonCriticalExtension          SEQUENCE{ }             OPTIONAL
}
PagingRecordList ::=          SEQUENCE (SIZE(1..maxNrofPageRec)) OF PagingRecord
PagingRecord ::=              SEQUENCE {
    ue-Identity                   PagingUE-Identity,
    accessType                    ENUMERATED {non3GPP}    OPTIONAL,    -- Need N
    ...
}
PagingUE-Identity ::=         CHOICE {
    ng-5G-S-TMSI                  NG-5G-S-TMSI,
    fullI-RNTI                    I-RNTI-Value,
    ...
}
-- TAG-PAGING-STOP
-- ASN1STOP
```

PagingRecord field descriptions accessType
Indicates whether the Paging message is originated due to the PDU sessions from the non-3GPP access.

A UE does not need to monitor paging channels continuously though; a paging DRX (Discontinued Reception) function is defined where the UE in RRC_IDLE or RRC_INACTIVE is only required to monitor paging channels during one Paging Occasion (PO) per DRX cycle (see 3GPP TS 38.304 v16.2.0, e.g., sections 6.1 and 7.1). The Paging DRX cycles (can also be called paging cycles) are configured by the network.

The POs of a UE for CN-initiated and RAN-initiated paging are based on the same UE ID, resulting in overlapping POs for both. The number of POs in a paging frame (PF) is configurable via system information, and a network may distribute UEs to those POs based on their IDs (e.g., the UE_ID below). A PO is a set of PDCCH monitoring occasions and can consist of multiple time slots (e.g., subtrame or OFDM symbol) where the paging DCI can be sent. One PF is one radio frame and may contain one or multiple PO(s) or starting point of a PO.

According to an exemplary 5G-compliant solution, the 3GPP technical standard 38.304 defines in section 7.1 the PF and PO for paging, using the following formulae, where SFN is the abbreviation for the system frame number:

SFN for the PF is determined by:

(SRN+PF_offset)mod T=(T div N)*(UE_ID mod N)

Index (i_s), indicating the index of the PO is determined by:

$$i\_s = \text{floor}(UE\_ID/N) \bmod Ns$$

The following parameters are used for the calculation of PF and i_s above:

T: DRX cycle of the UE (T is determined by the shortest of the UE specific DRX value(s), if configured by RRC and/or upper layers, and a default DRX value broadcast in system information. In RRC_IDLE state, if UE specific DRX is not configured by upper layers, the default value is applied).

N: number of total paging frames in T

Ns: number of paging occasions for a PF

PF_offset: offset used for PF determination

UE_ID: 5G-S-TMSI mod 1024

According to this example, the PDCCH monitoring occasions for paging are determined according to paging-SearchSpace as specified in TS 38.213 v16.3.0 and firstPDCCH-MonitoringOccasionOfPO and nrofPDCCH-MonitoringOccasionPerSSB-InPO if configured as specified in TS 38.331. When SearchSpaceId=0 is configured for pagingSearchSpace, the PDCCH monitoring occasions for paging are same as for RMSI (Remaining Minimum System Information).

When SearchSpaceId=0 is configured for paging-SearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the $(i\_s+1)^{th}$ PO. A PO is a set of consecutive PDCCH monitoring occasions, where 'S' is the number of actual transmitted SSBs determined according to ssb-PositionsInBurst SIB1, and X is the nrofPDCCH-MonitoringOccasionPerSSB-InPO if configured or is equal to 1 otherwise. The $[x*S+K]^{th}$ PDCCH monitoring occasion for paging in the PO corresponds to the $K^{th}$ transmitted SSB, where x=0, 1, . . . , X−1, K=1, 2, . . . , S. The PDCCH monitoring occasions for paging which do not overlap with UL symbols (determined according to tdd-UL-DL-ConfigurationCommon) are sequentially numbered from zero starting from the first PDCCH monitoring occasion for paging in the PF. When firstPDCCH-MonitoringOccasionOfPO is present, the starting PDCCH monitoring occasion number of $(i\_s+1)^{th}$ PO is the $(i\_s+1)^{th}$ value of the firstPDCCH-MonitoringOccasionOfPO parameter; otherwise, it is equal to $i\_s*S*X$. If X>1, when the UE detects a PDCCH transmission addressed to P-RNTI within its PO, the UE is not required to monitor the subsequent PDCCH monitoring occasions for this PO.

NOTE 1: A PO associated with a PF may start in the PF or after the PF.

NOTE 2: The PDCCH monitoring occasions for a PO can span multiple radio frames. When SearchSpaceId other than 0 is configured for paging-SearchSpace the PDCCH monitoring occasions for a PO can span multiple periods of the paging search space.

Parameters Ns, nAndPagingFrameOffset, nrofPDCCH-MonitoringOccasionPerSSB-InPO, and the length of default DRX Cycle are signaled in SIB1. The values of N and PF_offset are derived from the parameter nAndPaging-FrameOffset as defined in TS 38.331. The parameter first-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signalled in the corresponding BWP configuration.

If the UE has no 5G-S-TMSI, for instance when the UE has not yet registered onto the network, the UE shall use as default identity UE_ID=0 in the PF and i_s formulas above.

When in RRC_CONNECTED, the UE monitors the paging channels in any PO signaled in system information for a System Information (SI) change indication and/or a PWS (Public Warning System) notification. In case of Bandwidth Adaptation (BA) (see section 6.10 in TS 38.300), a UE in RRC_CONNECTED only monitors paging channels on the active BWP with common search space configured.

5G-S-TMSI is a 48 bit long bit string as defined in TS 23.501 [10]. 5G-S-TMSI shall in the formulae above be interpreted as a binary number where the left most bit represents the most significant bit.

Figure 7:
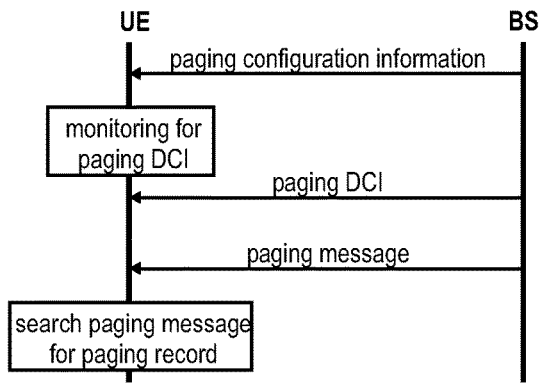
FIG. 7 illustrates a message exchange for a paging procedure.

FIG. 7 illustrates a simplified and exemplary paging procedure, particularly the messages exchanged between the base station and a UE. In particular, it is exemplarily assumed that the configuration of the paging procedure at the UE is provided by the base station. For instance, this configuration information provided by the base station could assist in defining the paging frame and paging occasion(s) of the UE. According to this paging configuration, the UE monitors the paging PDCCH (e.g., also called paging DCI) in its paging frame and paging occasions so as to try receiving the paging PDCCH based on its P-RNTI. If the CRC check (based on the P-RNTI) is correct (i.e., paging PDCCH is addressed to the P-RNTI), the UE receives the scheduled paging message (transmitted on the PDSCH). Then, the UE needs to search for its own paging record in the received paging message.

When the UE receives a paging message, the PDCCH monitoring can be stopped by the UE. Depending on the paging cause, the UE may continue with, e.g., obtaining system information, or establishing the RRC connection with the base station and then receiving the data (traffic/instruction) from the network.

Further Improvements

3GPP is constantly looking for further possibilities of UE power saving. An objective for power saving enhancement in Rel. 17 is directed to the study of paging enhancements to reduce unnecessary UE paging receptions, (if possible with no impact to legacy UEs), e.g., for idle/inactive UEs but also for UEs in connected mode.

The paging procedure is performed by UEs in the idle state, the inactive state as well as the connected state. Paging consumes relatively significant power for NR UEs in RRC idle state and RRC inactive states, while consuming relatively less power for UEs in the connected state.

Thus, optimizations of paging may save a large portion of the UE power consumption. For instance, two issues exist that may cause energy wasting.

First, every idle mode or inactive mode UE, has to wake up for each PF and PO and monitor for the paging PDCCH even when there is no paging at all from the network.

Second, there could be several UEs that are allocated within the same paging frame and paging occasion. In such a case, it is likely that the network only intends to page one or a subset of the UEs in said same PF and PO. However, the other UEs within the same PF and PO also need to go through the whole procedure of monitoring the paging PDCCH, receiving the paging message and searching for the paging record, so as to then conclude that there is no valid paging record for them.

For instance, from network point of view, the PF/PO allocation in each cell considers all the inactive/idle-mode UEs within the same tracking area. A UE could camp in any of the cells within a tracking area, with respect to idle-mode cell selection or reselection. In such scenarios, it is possible that in a certain cell, a high number of UEs are sharing a same PF and PO. Therefore, when only one UE (or a few UEs) is paged, numerous other UEs waste considerable energy in vain for the PDCCH monitoring and reception, PDSCH reception, and paging record search.

Furthermore, considering that the network frequency deployment can be more flexible, in some small cells that use a high frequency, the available number of PF and POs can be small, because of the larger values of the configured ssb-periodicityServingCell. Then, more UEs share a same PF and PO, thereby increasing said false-paged ratio and the resulting energy waste.

The above problem of paging is presented above and in the following primarily in the context of 5G NR, but is also applicable to the legacy paging functions, e.g., of 4G and 5G before the new Rel. 17.

The inventors have identified the above-discussed potential drawbacks and challenges. The inventors have thus identified the possibility of providing an improved paging procedure that allows avoiding or mitigating one or more of the above-identified problems. The present disclosure relates to different solutions and variants for such an improved paging procedure.

Embodiments

In the following, UEs, base stations, and procedures to meet these needs will be described for the new radio access technology envisioned for the 5G mobile communication systems, but which may also be used in LTE mobile communication systems. Different implementations and variants will be explained as well. The following disclosure was facilitated by the discussions and findings as described above and may for example be based at least on part thereof.

In general, it should be noted that many assumptions have been made herein so as to be able to explain the principles underlying the present disclosure in a clear and understandable manner. These assumptions are however to be understood as merely examples made herein for illustration purposes that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers, etc., used in the following are closely related to LTE/LTE-A systems or to terminology used in the current 3GPP 5G standardization, even though specific terminology to be used in the context of the new radio access techhnology for the next 3GPP 5G communication systems is not fully decided yet or might finally change. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology, but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

Communication between the UE and the base station is typically standardized and may be defined by different layers, such as PHY, MAC, RRC, etc., (see above background discussion).

The term "monitoring" can be broadly understood as trying to decode a possible candidate for receiving a DCI message, e.g., based on a particular format, or put more simply as trying to decode a DCI message. Such a decoding attempt can also be called blind decoding. A DCI message can be broadly understood, e.g., as a resource assignment message for uplink or downlink radio resources. Correspondingly, the term "monitoring function" can be broadly understood in this context as relating to the corresponding function performed by the UE for trying to decode a DCI message.

The term "index", e.g., of the expression "paging subgroup index", can be broadly understood as a decimal or bit value.

For the following solutions it is exemplarily assumed that the improved paging procedure is conceptually based on the paging procedure as defined according to 3GPP 4G or 5G standards.

For instance, in line with the general illustration in FIG. 7, such a paging procedure would at least involve the transmission/reception of the paging DCI on the downlink control channel (such as the PDCCH) and the subsequent transmission/reception of the paging message on the downlink shared channel (PDSCH), wherein the paging message is transmitted/received in accordance with the information provided by the paging DCI.

Generally, it is also assumed that the improved paging procedure can be performed by the UE in the idle mode, the inactive mode or the connected mode.

Figure 8:
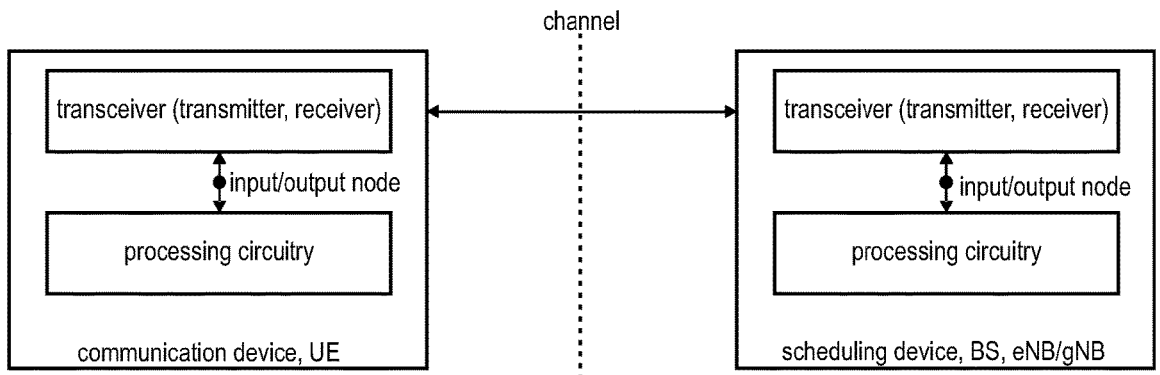
FIG. 8 illustrates an exemplary and simplified structure of a UE and gNB.

FIG. 8 illustrates a general, simplified and exemplary block diagram of a user equipment (also termed communication device) and a scheduling device (here exemplarily assumed to be located in the base station, e.g., the eLTE eNB (alternatively termed ng-eNB) or the gNB in 5G NR). The UE and eNB/gNB are communicating with each other over a (wireless) physical channel respectively using the transceiver.

The communication device may comprise a transceiver and processing circuitry. The transceiver in turn may comprise and/or function as a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data, which is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto, such as monitoring a channel.

Different embodiments of an improved paging procedure will be described in the following. In said connection, improved UEs and improved base stations are presented, which participate in the improved paging procedure. Corresponding methods for the UE behavior and the base station behavior are provided as well.

First Set of Solutions

Figure 9:
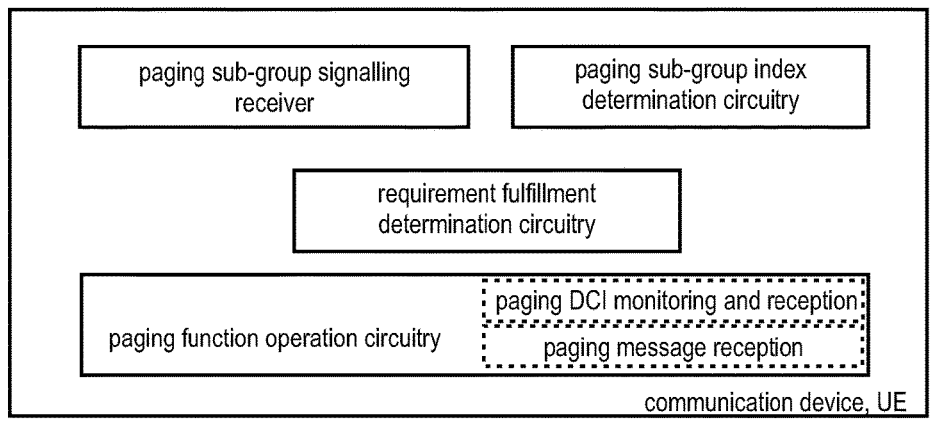
FIG. 9 illustrates a structure of the UE according to an exemplary implementation of an improved paging procedure.

FIG. 9 illustrates a simplified and exemplary UE structure according to one exemplary solution of the improved paging procedure, which can be implemented based on the general UE structure explained in connection with FIG. 8. The various structural elements of the UE illustrated in said figure can be interconnected between one another, e.g., with corresponding input/output nodes (not shown), e.g., in order to exchange control and user data and other signals. Although not shown for illustration purposes, the UE may include further structural elements.

As apparent from FIG. 9, the UE may include a paging sub-group signalling receiver, a paging sub-group index determination circuitry, a requirement fulfillment determination circuitry, and paging function operation circuitry.

In the present case as will become apparent from the below disclosure, the receiver of the UE can thus be exemplarily configured to at least partly perform one or more of receiving paging sub-group signalling, receiving paging DCIs and paging messages, etc.

Furthermore, in the present case as will become apparent from the below disclosure, the processing circuitry (also termed processor) of the UE can thus be exemplarily configured to at least partly perform one or more of performing a paging function, of determining a paging sub-group index, of determining how to operate the paging function, etc.

Furthermore, in the present case as will become apparent from the below disclosure, the transmitter of the UE can thus be exemplarily configured to at least partly perform one or more of transmitting a response to the paging, etc.

One exemplary solution as will be disclosed in more detail further below is implemented by a UE that includes the following. A processor of the UE operates a paging function that includes monitoring of a downlink control channel for receiving a paging downlink control information, DCI, and includes receiving of a paging message, the paging DCI and the paging message being transmitted from a base station. A receiver of the UE receives paging sub-group signalling from the base station. The processor determines a paging sub-group index based on the received paging sub-group signalling. The processor determines how to operate the paging function based on whether or not the determined paging sub-group index fulfils a requirement that involves an identification of the UE.

Figure 10:
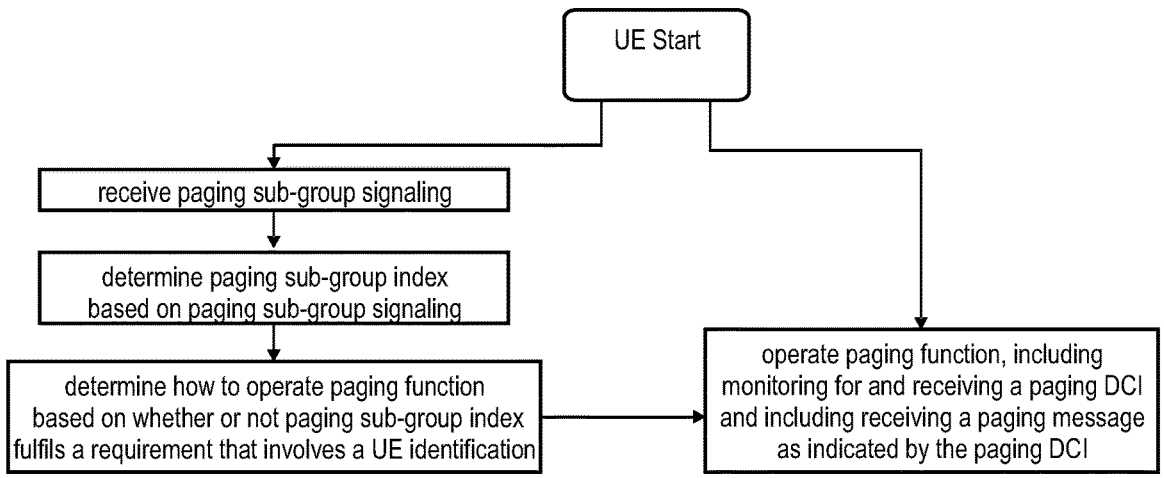
FIG. 10 is a flow diagram for the UE behavior, according to an exemplary implementation of the improved paging procedure.

A corresponding sequence diagram for an exemplary UE behavior in line with the above-discussed UE is defined in the following and illustrated in FIG. 10. The method comprises the following steps performed by a user equipment:
operating a paging function that includes monitoring of a downlink control channel for receiving a paging downlink control information, DCI, and includes receiving of a paging message, the paging DCI and the paging message being transmitted from a base station,
receiving paging sub-group signalling from the base station,
determining a paging sub-group index based on the received paging sub-group signalling, and
determining how to operate the paging function based on whether or not the determined paging sub-group index fulfils a requirement that involves an identification of the UE.

According to this improved paging procedure, it is possible to control the further operation of the paging function at an early point of time based on the received paging sub-group signaling, particularly the paging sub-group index determined therefrom. Correspondingly, it is possible for the UE to save power in those cases where the paging sub-group index does not fulfill the requirement, e.g., the paging is not intended for that UE. For instance, the UE does not need to receive the paging message and search for its paging record in the paging message.

Figure 11:
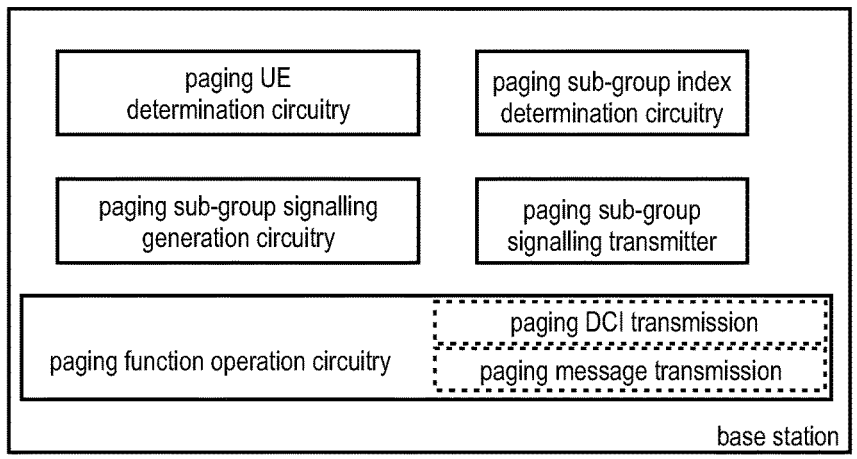
FIG. 11 illustrates a structure of the base station according to an exemplary implementation of the improved paging procedure.

As already apparent from above, the improved paging procedure also provides an improved radio base station. FIG. 11 illustrates a simplified and exemplary base station structure according to one exemplary solution of the improved paging procedure, and which can be implemented based on the general base station structure explained in connection with FIG. 8. The various structural elements of the radio base station illustrated in said FIG. 11 can be interconnected between one another, e.g., with corresponding input/output nodes (not shown), e.g., in order to exchange control and user data and other signals. Although not shown for illustration purposes, the base station may include further structural elements.

As apparent from FIG. 11, the base station may include paging UE determination circuitry, paging sub-group index determination circuitry, paging sub-group signaling generation circuitry, a paging sub-group signaling transmitter, and paging function operation circuitry.

In the present case as will become apparent from the below disclosure, the receiver of the base station can thus be exemplarily configured to at least partly perform one or more of receiving a response to a paging, etc.

In the present case as will become apparent from the below disclosure, the processing circuitry of the base station can thus be exemplarily configured to at least partly perform one or more of determining a UE to be paged, of determining a paging sub-group index, of generating paging sub-group signaling, etc.

In the present case as will become apparent from the below disclosure, the transmitter of the base station can thus be exemplarily configured to at least partly perform one or more of transmitting paging sub-group signaling, of transmitting a paging DCI and a paging message, etc.

One exemplary solution as will be disclosed in more detail further below is implemented by a radio base station that includes the following. A processor of the base station operates a paging function that includes transmission of a paging downlink control information, DCI, on a downlink control channel and includes transmission of a paging message, as indicated by the paging DCI. The processor determines a user equipment to be paged using the paging function. The processor determines a paging sub-group index based on a requirement that involves an identification of the determined UE, and generates paging sub-group signalling based on the deteimined paging sub-group index. A transmitter of the base station transmits the generated paging sub-group signalling to the determined UE.

Figure 12:
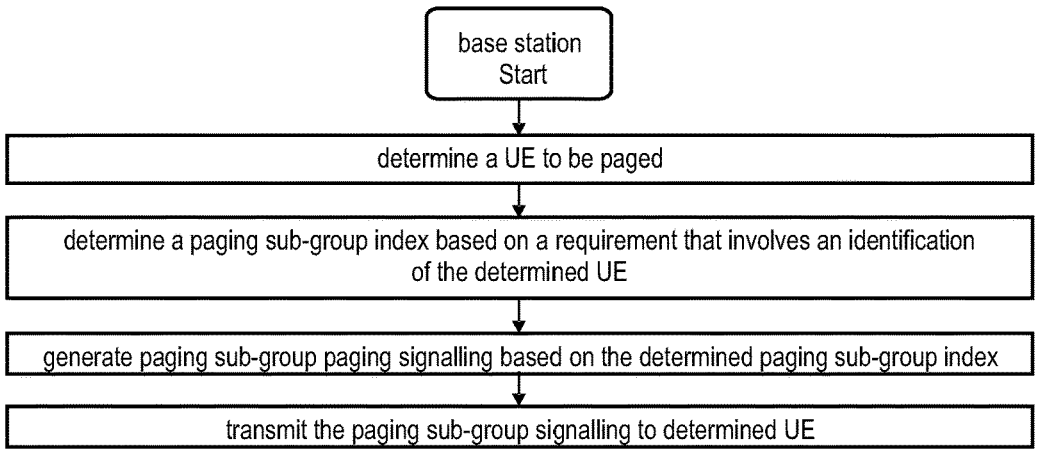
FIG. 12 is a flow diagram for the base station behavior, according to an exemplary implementation of the improved paging procedure.

A corresponding sequence diagram for an exemplary base station behavior in line with the above-discussed base station is illustrated in FIG. 12. A corresponding method comprises the following steps performed by a base station:
  operating a paging function that includes transmission of a paging downlink control information, DCI, on a downlink control channel and includes transmission of a paging message, as indicated by the paging DCI,
  determining a user equipment to be paged using the paging function,
  determining a paging sub-group index based on a requirement that involves an identification of the determined UE, and generates paging sub-group signalling based on the determined paging sub-group index, and
  transmitting the generated paging sub-group signalling to the determined UE.

Correspondingly, the improved base station participates in the improved paging procedure thereby facilitating that the operation of the paging function is controlled at an early point in time, based on the transmitted paging sub-group signaling. UEs that are not addressed by the paging sub-group index may thus save power particularly because the paging sub-group index, derivable from the paging sub-group signaling, does not fulfill the requirement used by the UEs to determine how to operate the paging function, e.g., the paging is not intended for those UEs.

In the following, different exemplary implementations will be disclosed on how to implement the above-presented improved paging procedure. Conceptually, it is the aim of the different solutions to allow indicating the subgrouping of UEs for paging to the LIEs at an early point in time, so as to then allow UEs to stop proceeding with the paging function and thus allowing the UE to save power by not proceeding with the paging function if determining that it does not belong to this paging sub-group.
First Solution According to a first solution of the improved paging procedure (and variants and implementations thereof), a pre-paging DCI is used as the paging sub-group signaling. Correspondingly, the pre-paging DCI includes a field with information that allows the UE to determine the above noted paging sub-group index.

The pre-paging DCI is transmitted at a known titne before the paging DCI so as to then allow the UE to determine whether or not it is even necessary to proceed with the next step of the paging function, which is to monitor for and receive the paging DCI (as well as the further subsequent steps of the paging function, e.g., to then eventually continue to receive the paging message as indicated by the paging DCI). In particular, the UE determines whether the paging sub-group index, derived from the pre-paging DCI, fulfills the requirement; in other words, the UE determines whether it is in the paging sub-group. This requirement is UE-specific in that it involves, e.g., the use of a suitable identification of the UE. Then, in case the UE determines that the paging sub-group index fulfill the requirement, the UE proceeds with the next step of the paging function, which is to monitor the downlink control channel to receive the paging DCI.

Figure 13:
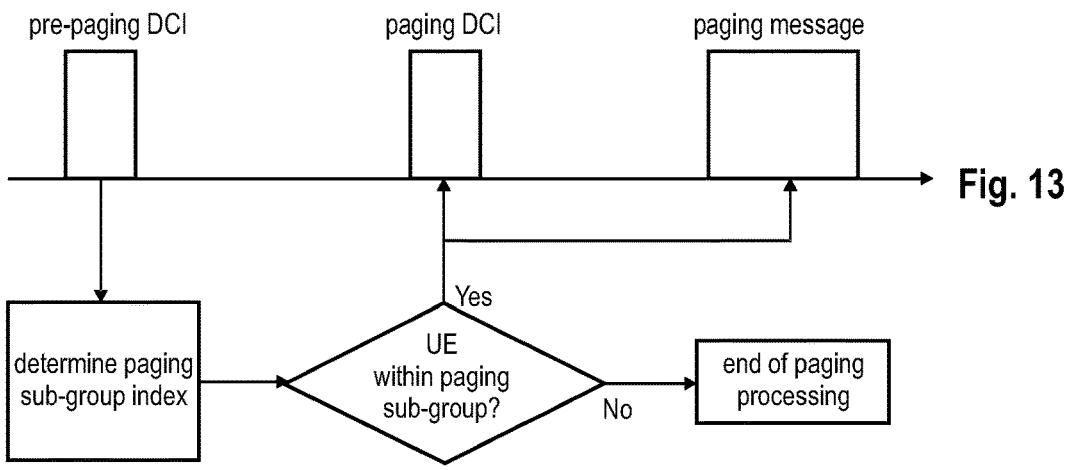
FIG. 13 illustrates a UE behavior for a first solution of the improved paging procedure.

This sequence of steps performed by the UE is illustrated in an exemplary and simplified manner in FIG. 13. As apparent therefrom, the paging sub-group index is obtained from the pre-paging DCI and used by the UE to determine whether or not it belongs to the indicated paging sub-group. If yes, the UE proceeds with the paging function to obtain the paging DCI and then the paging message.

On the other hand, if no, the paging processing may be terminated by the UE, e.g., the UE does not perform the next steps of the paging function and thus does not monitor the downlink control channel for a paging DCI and thus neither receives the paging DCI nor the paging message. In fact, in such a case, the paging message would not include the paging record for this UE, such that the subsequent operation of the paging function and the corresponding power expenditure can be avoided.

As mentioned above, the pre-paging DCI is transmitted before the actual paging DCI would be transmitted, e.g., before one of the paging occasions configured for a paging frame. The exact point in time would be known to both the UE and the base station. For example, the pre-paging DCI could be transmitted by the base station in the same paging frame but a particular number of subframes before, e.g., the first paging occasion of said radio frame. According to another example, the pre-paging DCI is transmitted in a search space that is a number of slots before, e.g., the first paging occasion of the paging frame.

There are several possibilities on how to implement the pre-paging DCI and to achieve its functionality. Examples thereof will be presented in the following.

The pre-paging DCI can be structured to allow the UE to save power compared to monitoring and receiving the normal paging DCI. For instance, the pre-paging DCI can be one or more of 1) having a more compact DCI format, 2) be associated with less blind-decoding candidates, and 3) have a shorter monitoring duration compared to the normal paging DCI.

For instance, the pre-paging DCI can reuse an existing DCI format, such as the DCI format 2_6 or 1_0, as defined in the suitable 3GPP 5G standards. Alternatively, a new DCI format can be defined for the pre-paging DCI.

Importantly, the pre-paging DCI carries information on the paging sub-group index in a suitable field. For example, if an existing DCI format is reused, a corresponding existing field can be reused to indicate the paging subgroup index. Exemplarily assuming the existing paging DCI is reused, then the short-message-related field therein could be reused. The information in the field relating to the paging sub-group index can have one or several bits.

Moreover, it is possible that the normal paging UE identity, P-RNTI, is used for scrambling the pre-paging DCI. Alternatively, another identity can be used for the scrambling operation.

From the perspective of the base station, the base station has to transmit the pre-paging DCI to the UE, including the field with the information on the paging sub-group index. Correspondingly, based on a suitable UE identification (see below UE_ID, e.g.) of the UE that is to be paged, the base station determines a paging sub-group index such that the paged UE will determine that it belongs to the paging sub-group (based on the mentioned requirement). The base station then generates the pre-paging DCI, including the paging sub-group index (or suitable information thereon) in a field of the pre-paging DCI, before transmitting same to the paged UE.

Based on this first solution, it is possible to already avoid that some of the non-paged UEs do not need to monitor for and receive the paging DCI, in addition to avoiding that the additional processing involved in receiving and processing the paging message on the PDSCH. Furthermore, by using a suitable DCI, this first solution is flexible in providing the paging sub-group index.

Second Solution

According to a second solution of the improved paging procedure (and variants and implementations thereof), the paging DCI itself is used as the paging sub-group signaling. Correspondingly, the paging DCI includes a field with information that allows the UE to determine the above noted paging sub-group index.

Overall, the UE thus monitors the downlink control channel so as to receive the paging DCI, which carries information to determine the paging sub-group index. By checking a UE-specific requirement against this indicated paging sub-group index, the UE is able to determine whether or not to proceed with the next steps of the paging function, which in this case is whether or not to receive the paging message as indicated by the paging DCI.

Figure 14:
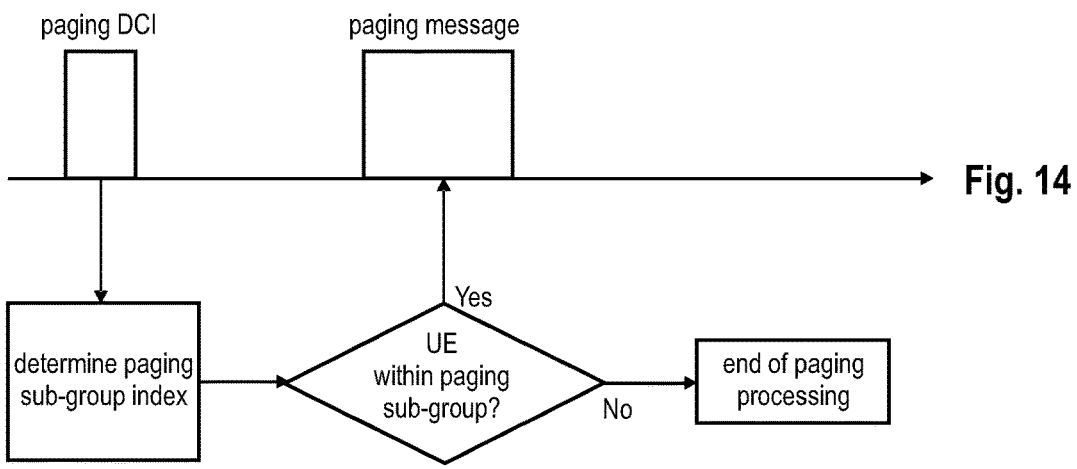
FIG. 14 illustrates a UE behavior for a second solution of the improved paging procedure.

This sequence of steps performed by the UE is illustrated in an exemplary and simplified manner in FIG. 14. As apparent therefrom, the paging sub-group index is obtained from the paging DCI and used by the UE to determine whether or not it belongs to the indicated paging sub-group. If yes, the UE proceeds with the paging function to obtain the paging message.

On the other hand, if no, the paging processing may be terminated by the UE, e.g., the UE does not perform the next steps of the paging function and thus does not receive the paging message. In fact, in such a case, the paging message would not include the paging record for this UE, such that the subsequent operation of the paging function and the corresponding power expenditure can be avoided.

Compared to the first solution discussed above, the UE needs to monitor for and receive the paging DCI in order to determine the paging sub-group index. On the other hand, by providing the information to derive the paging sub-group index in the paging DCI, it is possible to provide a good flexibility in differentiating between several paging sub-groups.

There are several possibilities on how to implement the paging DCI and to achieve its functionality. Examples thereof will be presented in the follor,ving.

The DCI format 1_0 with CRC scrambled by P-RNTI as currently used in a 5G standard is presented in the following (see, e.g., 38.212 v16.3.0, section 7.3.1.2.1). The paging sub-group index could be encoded into the short message field below. Alternatively, the paging sub-group index could be encoded into the reserved field below.

| <DCI format 1_0 with CRC scrambled by P-RNTI>: This is used to schedule Paging messages | | |
|---|---|---|
| Field (Item) | Bits | Reference |
| Short Message Indicator | 2 | Refer to 38.212 - Table 7.3.1.2.1-1 |
| Short Messages | 8 | This field is set as reserved when 'Short Message Indicator' field is 01. Refer to 38.331 - Table 6.5-1 |

| <DCI format 1_0 with CRC scrambled by P-RNTI>: This is used to schedule Paging messages — continued | | |
|---|---|---|
| Field (Item) | Bits | Reference |
| Frequency domain resource assignment | Variable | Variable with DL BWP N_RB $\lceil \log_2(N_{RB}^{DL,\,BWP}(N_{RB}^{DL,\,BWP}+1)/2) \rceil$ $N_{RB}^{DL,\,BWP}$ indicates the size of CORESET 0 |
| Time domain resource assignment | 4 | Carries the row index of the items in pdsch_allocationList in RRC |
| VRB-to-PRB mapping | 1 | According to 38.212 Table 7.3.1.1.2-33 0: Non-Interleaved 1: Inverleaved |
| Modulation and coding scheme | 5 | 38.214 - Table 5.1.3.1-1: MCS index table 1 for PDSCH 38.214 - Table 5.1.3.1-2: MCS index table 2 for PDSCH |
| TB Scaling | 2 | |
| Reserved | 6 | Reserved |

| <38.212 - Table 7.3.1.2.1-1: Short Message indicator> | |
|---|---|
| Bit Field | Short Message Indicator |
| 00 | Reserved |
| 01 | Only scheduling information for Paging is present in the DCI |
| 10 | Only short message is present in the DCI |
| 11 | Both scheduling information for Paging and short message are present in the DCI |

| <38.331 - Table 6.5-1: Short messages> | |
|---|---|
| Bit | Short Message Indicator |
| | systemInfoModification |
| 1 | If set to 1: indication of a BCCH modification other than SIB6, SIB7 and SIB8. |
| | etwsAndCmasIndication |
| 2 | If set to 1: indication of an ETWS primary notification and/or an ETWS secondary notification and/or a CMAS notification |
| 3-[8] | Not used in this release of the specification, and shall be ignored by UE if received. |

Importantly, the paging DcI carries information on the paging sub-group index in a suitable field, such as the mentioned short message field. The information in the reused field can have one or several bits.

Third Solution

According to a third solution of the improved paging procedure (and variants and implementations thereof), a reference signal or a synchronization signal is used as the paging sub-group signaling. The determination of the paging sub-group index is performed by first determining a characteristic of the reference or synchronization signal and then determining the paging sub-group index based on this determined characteristic.

As mentioned above, the improved paging procedure may also be applicable to idle and inactive UEs which thus should be enabled to receive the reference and synchronization signal too.

A system information broadcast can be used by the base station to provide configuration information to the UE relating to the reference or synchronization signal.

The reference or synchronization signal is transmitted before the actual paging DCI so as to allow the UE to first determine whether or not it is even necessary to monitor for and receive the paging DCI. To said end, the paging sub-group index is first derived from the received reference or synchronization signal as will be explained in the following, and then the determined paging sub-group index is checked as to whether it fulfills a suitable UE-specific requirement, as already explained above. Then, in case the UE determines that the paging sub-group index fulfills the requirement, i.e., may be understood in that the UE indeed belongs to the paging sub-group, the UE proceeds with the next steps of the paging function, including to monitor the downlink control channel so as to receive the paging DCI and later receiving and processing the corresponding paging message as indicated by the paging DCI. On the other hand, if the requirement is not fulfilled, the UE concludes, that the subsequent paging is not intended for itself, and does not proceed with the paging function, e.g., does not monitor the downlink control channel and thus does not receive the paging DCI and the subsequent paging message.

Figure 15:
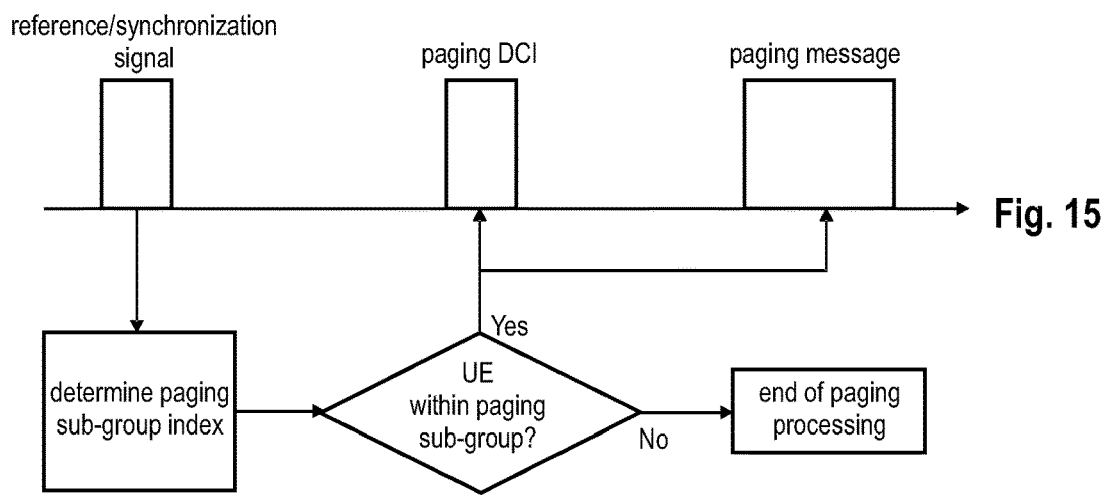
FIG. 15 illustrates a UE behavior for a third solution of the improved paging procedure.

This sequence of steps performed by the UE is illustrated in an exemplary and simplified manner in FIG. 15. As apparent therefrom, the paging sub-group index is obtained from the reference signal or the synchronization signal and used by the UE to determine whether or not it belongs to the indicated paging sub-group. If yes, the UE proceeds with the paging function to obtain the paging DCI and then the paging message.

On the other hand, if no, the paging processing may be terminated by the UE, e.g., the UE does not perform the next steps of the paging function and thus does not monitor the downlink control channel for a paging DCI and thus neither receives the paging DCI nor the paging message. In fact, in such a case, the paging message would not include the paging record for this UE, such that the subsequent operation of the paging function and the corresponding power expenditure can be avoided.

As mentioned above, the reference signal or synchronization signal for the subgrouping of the paged UE is transmitted before the actual paging DCI would be transmitted, e.g., before one of the paging occasions configured for a paging frame. The exact point in time would be known to both the UE and the base station. For example, the reference or synchronization signal could be transmitted by the base station in the same paging frame but a particular number of slots before, e.g., the first paging occasion of said radio frame. Alternatively, the reference or synchronization signal could be transmitted a certain time window before and/or after the first SSB but before the first paging occasion of the paging frame.

When receiving a reference/synchronization signal, the processing procedure is of less complexity than when receiving a regular PDCCH. As a typical implementation, receiving reference signal involves operations of energy detection and/or sequence correlation. However, for receiving a PDCCH, it involves firstly RS reception, channel estimation, demodulation, and then channel decoding, which requires the processor to consume more power than just receiving a reference/synchronization sipnal.

In more detail, a reference signal is first human to as the paging sub-group signaling in the following. A characteristic of such a reference signal could be one or more of a reference signal pattern and a reference signal sequence. It is assumed that the reference signal can be transmitted according to a plurality of different patterns, e.g., reference signal is carried at different positions in the frequency and time domain. The UE determines a pattern among these plurality of patterns based on the previously determined time/frequency positions of the reference signal. The UE then associates the determined pattern with a particular paging sub-group index, e.g., based on a suitable association table.

An example of a reference signal, e.g., in a 5G compliant implementation, would be the CSI-RS, as explained in the corresponding section above. In the above CSI-RS-related table, several different patterns are defined, where, e.g., each row can be understood as one pattern.

Another characteristic could be the actual sequence transmitted as the reference signal. Typically, a sequence for a reference signal is generated based on different parameters thereby obtaining different sequences. According to such an implementation, a plurality of sequences would be available to be transmitted as the reference signal. Then, the UE, by determining which sequence among the plurality of sequences is transmitted as the reference signal, is able to determine the intended paging sub-group index therefrom.

An example of a reference signal, e.g., in a 5G compliant implementation, would be the CSI-RS, as explained in the corresponding section above. The section above also exemplifies how the reference signal sequence r(m) is generated, depending on various different parameters. One of the parameters used for generating the sequence is $n_{ID}$, which is taken from the higher-layer parameters scramblingID or sequenceGenerationConfig. The paging sub-group index can be encoded as a function of this parameter $n_{ID}$. In the current 3GPP 5G standards, the candidates for the parameter $n_{ID}$ can be broadcast to the UEs such that each UE knows how many and which sequences it should detect.

Correspondingly, the base station generates the sequence of the reference signal using the suitable parameter so as to allow the UE to derive therefrom the corresponding paging sub-group index.

Moreover, now it is assumed that a synchronization signal is used as the paging sub-group signaling. A characteristic of such a synchronization signal could be the sequence transmitted as the synchronization signal.

Typically, a sequence for a synchronization signal is generated based on different parameters thereby obtaining different sequences. According to such an implementation, a plurality of sequences would be available to be transmitted as the synchronization signal. Then, the UE, by determining which sequence among the plurality of sequences is transmitted as the synchronization signal, is able to determine the intended paging sub-group index therefrom.

An example of a reference signal, e.g., in a 5G compliant implementation, would be the secondary synchronization signal (SSS) (see above section on SSS). The section above also exemplifies how the secondary synchronization signal sequence $d_{SSS}(n)$ is generated, depending on various different parameters. One of the parameters used for generating the sequence is $N_{ID}$. The paging sub-group index can be encoded as a function of this parameter $N_{ID}$.

A further variant of this third solution focuses on how to handle a scenario where the UE is not able to reliably identify a characteristic of the reference signal or the synchronization signal. For instance, the UE may not be able to identify a reference signal pattern among the plurality of reference signal patterns. In such a case, the UE may determine that it should continue with the steps of the paging function (e.g., Monitor for and receive the paging DCI), hypothetically assuming—out of precaution—that the UE is addressed for the subsequent paging.

Fourth Solution

The fourth solution re-uses the concepts introduced above in the second and third solutions so as to provide a two-level paging sub-grouping determination at the UE side. In more detail, according to a first level, a reference signal or a synchronization signal is used as the paging sub-group signaling. As described for the third solution, the determination of the paging sub-group index (here now a first paging sub-group index) is performed by first determining a characteristic of the reference or synchronization signal and then determining this first paging sub-group index based on this determined characteristic. The first paging sub-group index is then used to determine whether a requirement is fulfilled, such that the UE determines whether it belongs to the paging sub-group of UEs indicated by this first paging sub-group index.

In case the first paging sub-group index fulfils this UE-specific requirement, the UE concludes that it belongs to the sub-group of UEs for which the subsequent paging is intended. Consequently, the UE proceeds with the paging function and monitors the downlink control channel to receive the paging DCI.

According to this fourth solution, the paging DCI implements the second level of the paging sub-grouping determination, in that it includes a field with information for the UE to determine a second paging sub-group index. The UE determines whether the second paging sub-group index fulfils a UE-specific requirement, so as to determine whether the. UE belongs to the sub-group of UEs indicated by the second paging sub-group index.

In case the second paging sub-group index fulfils this UE-specific requirement, the UE concludes that it belongs to the sub-group of UEs for which the subsequent paging message is intended, and thus proceeds with the paging function and receives the paging message, in accordance with the information of the paging DCI.

Figure 16:
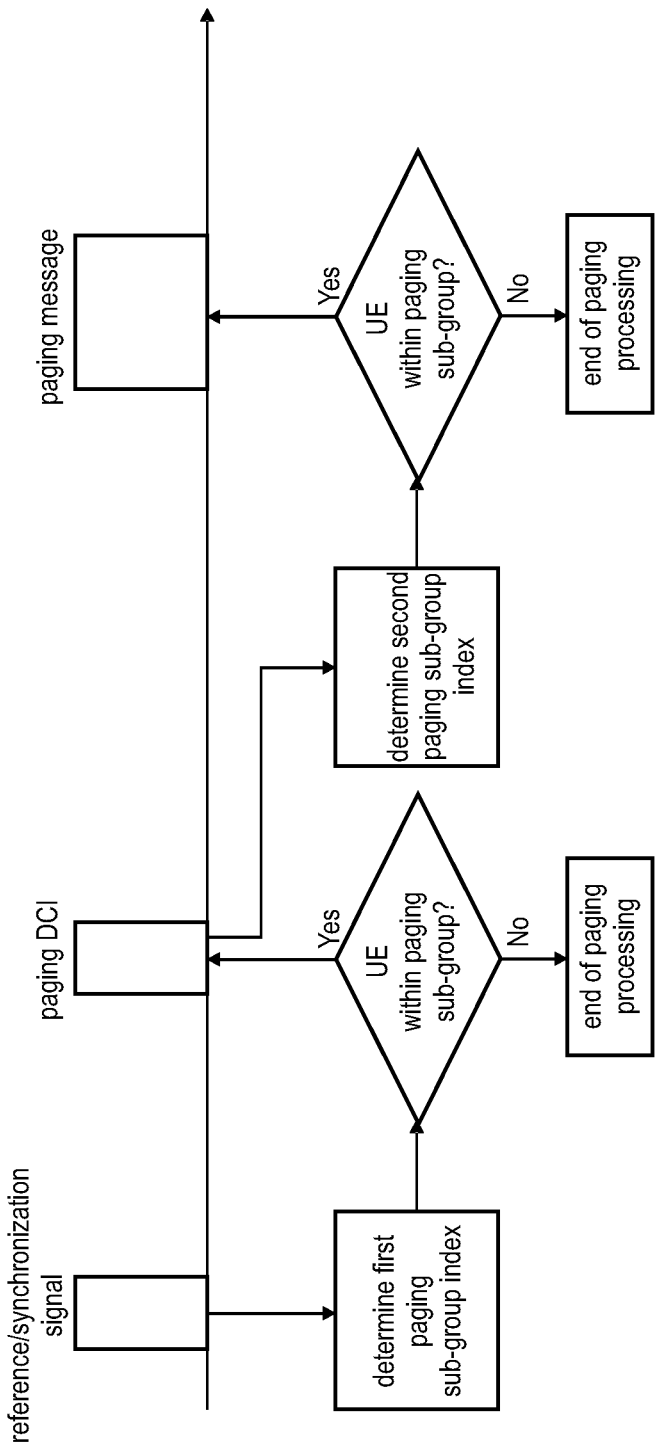
FIG. 16 illustrates a UE behavior for a fourth solution of the improved paging procedure.

This sequence of steps performed by the UE is illustrated in an exemplary and simplified manner in FIG. 16. As apparent therefrom, the first paging sub-group index is obtained from the reference signal or synchronization signal and used by the UE to determine whether or not it belongs to the indicated paging sub-group. If yes, the UE proceeds with the paging function to obtain the paging DCI. Otherwise, the UE may already abort the paging function and not proceed to receive the paging DCI, and later also not the paging message.

According to the second level, the UE determines the second paging sub-group index from the paging DCI, and uses the same to determine whether or not it again belongs to the indicated paging sub-group. If so, the UE proceeds with the paging function to obtain the paging message. Otherwise, the paging processing may be terminated by the UE so as to not receive the paging message.

The above second solution provides information and explanation on how the first level of the determination of this fourth solution can be implemented, particularly how to use the paging DCI as the paging sub-group signaling. The above different variants and implementations of this second solution can be equally applied to this second level of the fourth solution. In order to avoid repetition, reference is made to the above sections, such as to the details on the paging DCI format, fields, contents, etc.

Moreover, the above third solution provides information explanation how the first level of the determination of this fourth solution can be implemented, particularly how to use a reference signal or synchronization signal to convey a paging sub-group index (in this fourth solution used as the first paging sub-group index). The above different variants and implementation of this third solution can be equally applied to this first level of the fourth solution. In order to avoid repetition, reference is made to the above sections, such as to the details on how and when the reference or synchronization signal can be received, on the different characteristics of the reference/synchronization signal, the possible 5G-compliant implementations (CSI-RS, SSS), etc.

Also, a variant of the fourth solution focuses on how to handle a scenario where the UE is not able to reliably identify a characteristic of the reference signal or the synchronization signal in the first level. As described for the third solution, in such a ease the UE may determine that it continues with the steps of the paging function (e.g., monitor for and receive the paging DCI), hypothetically assuming—out of precaution—that the UE is addressed for the subsequent paging.

The above third and fourth solutions rely on a reference signal as the paging sub-group signalling, and in exemplary implementation the CSI-RS, such as from a 5G standard, is used.

In the following, an improved usage of the reference signal, such as the CSI-RS, will be explained. In particular, it is assumed that a plurality of different reference signal configurations are defined to be used for indicating the paging sub-group indexes. In addition, a different configuration Y is then provided, which is defined by using a pattern (e.g., the resource elements in time and frequency) including (or consisting of) the overlap (or intersections or common part) of this plurality of different reference signal configurations that indicate the paging sub-group indexes. Then, this reference signal configuration Y can he used by the UE for perfortning measurements, such as for time/frequency tracking and/or the service cell measurements.

The above variant of the third and fourth solutions allows to reduce the overhead (e.g., otherwise the resources can no longer be used for data transmission) for the sub-grouping indication and the time/frequency tracking and serving cell measurements.

As mentioned before, the reference signal used as the paging sub-group signaling for the improved paging procedure can be configured by the base station using a system information broadcast. According to one example that assumes the use of the 5G CSI-RS as this reference signal, the configuration can be implemented as follows. In the CSI-RS configuration in SIB, the bandwidth for CSI-RS transmission is configured/mapped as the initial BWP. Or configured as a number of RB s in a certain configured BWP.

Or the bandwidth of the up mentioned CSI-RS is fixed or assumed same as the cell defining SSB.

Or the bandwidth of the up mentioned CSI-RS is fixed or assumed same as the CORESET #0.

One exemplary 5G-compliant implementation relies on the CSI-RS (see above section) as being the reference signal. The above provided table for CSI-RS locations within a slot is exemplarily assumed for the following explanations of the underlying concept. An excerpt of same, particularly the first 8 rows thereof, is copied below.

Table: CSI-RS locations within a slot, first 8 rows only

| Row | Ports X | Density ρ | cdm-Type | $(\bar{k}, \bar{l})$ | CDM group index j | k' | l' |
|---|---|---|---|---|---|---|---|
| 1 | 1 | 3 | noCDM | $(k_0, l_0), (k_0 + 4, l_0), (k_0 + 8, l_0)$ | 0, 0, 0 | 0 | 0 |
| 2 | 1 | 1, 0.5 | noCDM | $(k_0, l_0)$, | 0 | 0 | 0 |
| 3 | 2 | 1, 0.5 | fd-CDM2 | $(k_0, l_0)$, | 0 | 0, 1 | 0 |
| 4 | 4 | 1 | fd-CDM2 | $(k_0, l_0), (k_0 + 2, l_0)$ | 0, 1 | 0, 1 | 0 |
| 5 | 4 | 1 | fd-CDM2 | $(k_0, l_0), (k_0, l_0 + 1)$ | 0, 1 | 0, 1 | 0 |
| 6 | 8 | 1 | fd-CDM2 | $(k_0, l_0), (k_1, l_0), (k_2, l_0), (k_3, l_0)$ | 0, 1, 2, 3 | 0, 1 | 0 |
| 7 | 8 | 1 | fd-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | cdm4-FD2-TD2 | $(k_0, l_0), (k_1, l_0)$ | 0, 1 | 0, 1 | 0, 1 |

In line with the above general explanation of the variant, a specific CSI-RS configuration Y is defined with a configuration of resource elements according to the intersections (overlap) of some or all of the CSI-RS configurations that are used for the paging sub-grouping.

According to a first example, it is assumed that the CSI-RS configurations of row #4 and #5 are used to indicate two different sub-groups, e.g., CSI-RS configuration of row #4 (or more precisely its pattern) allowing the UE to determine one paging sub-group index, and CSI-RS configuration of row #5 (or more precisely its pattern) allowing the UE to determine another paging sub-group index. As can be seen from the above table, the CSI-RS configurations of rows #4 and #5 have an overlapping (intersecting, common) pattern consisting of resource elements $(k_0, l_0)$ with k' ={0,1}, which in fact corresponds to the CSI-RS configuration of row #3, which can thus be considered as the above-mentioned CSI-RS configuration Y.

Moreover, the common part of the resource elements is of the CDM group 0 (see corresponding column and parameter j of above table), such that the CSI--RS sequence mapped to the locations of the CSI-RS configuration of row #3 can be the same as for the CSI-configurations of rows #4, #5.

According to a second example, the CSI-RS configuration of row #4 is used for the subgrouping of three subgroups #1, 2, 3, by using different sequences. The common part corresponds to resource elements $(k_0, l_0)$ with k'={0,1}, which is the same as the CSI-RS configuration of row #3 (i.e., the CSI-RS configuration Y).

Moreover, the common part of the resource elements is of the CDM group 0. So the CSI-RS sequence mapped to the :locations of the resource elements can be the same for all these CSI-RS configurations. Furthermore, for the CDM group index 1 part, the three CSI-RS configurations of row#4 are code-division multiplexed.

In the above, four different solutions were described on how a paging sub-grouping can be implemented, mainly differing in what is transmitted as the paging sub-group signalling and the resulting differences in how the paging function is further operated. Specifically, based on the result of a determination based on the paging sub-group signaling, the UE determines whether or not to proceed with the paging function (e.g., proceeding with the next step of receiving the paging DCI and then the paging message, or of receiving the paging message). Put differently, the next steps of the paging function may not need to be performed, e.g., for a time, such that some non-paged UE achieve to save power, in case the UE determines that it does not belong to the indicated paging sub-group.

In the following, further information is provided on how parts of the above four solutions can be adapted or implemented.

In the above explanations of the four solutions, it was broadly explained how the UE determines whether the paging sub-group index fulfils a requirement. There are several possibilities on how this requirement can be implemented. According to first exemplary variants, the requirement requires that a subset of bits of a value derived from the UE identification is the same as, or larger than, or smaller than bits representing the paging sub-group index.

This subset of bits could be, e.g., a number of the most-significant bits of the value or a number of the least-significant bits of the value, or a number of middle bits of the value. Furthermore, the subset of bits could even be composed of bits from non-contiguous bit positions of the value.

According to further variants, the requirement can also be expressed using one of the following equations:

$$\text{UE\_ID divided by N\_PF} == X, \quad \quad 1)$$

$$\text{UE\_ID divided by N\_PF} > X, \quad \quad 2)$$

$$\text{UE \_ID divided by N\_PF} < X, \quad \quad 3)$$

$$\textit{UE\_ID divided by N\_PF} == i*X, \text{ or} \quad \quad 4)$$

$$\text{UE\_ID divided by N\_PF mod Y} == X, \quad \quad 5)$$

wherein UE_ID denotes the identification of the UE, N_PF denotes a number of paging frames in a paging cycle configured for the UE, X denotes the paging sub-group index, where i=0, 1, 2, 3, . . . , and where Y is a number representing a number of sub-groups (and can be configured, e.g., by the base station using system information broadcast).

The operation "==" is to be understood broadly as meaning that the value on the left side is equivalent to or corresponds to the value on the right side.

According to one example, it is assumed that the paging sub-group index, derived from either of the above four solutions provides 1 bit, which can be either 1 or 0. Then, when determining whether this one-bit paging sub-group index fulfils the requirement, it can be, e.g., determined whether the 1-bit has the same value as the corresponding one-bit-sized subset of bits of (UE_ID divided by N_PF) (e.g., the most-significant bit or the least-significant bit thereof). If the value of the two compared bits is the same, the UE may derive that the 1-bit paging sub-group index fulfils the requirement. Conversely, if the value of the two compared bits is not the same, e.g., paging sub-group index=0 and MSB of (UE_ID divided by N_PF)=1, the UE may derive that the 1-bit paging sub-group index does not fulfil the requirement.

Moreover, the particular implementation of the requirement according to the above options influences the granularity of the subgrouping of the UEs for the paging function. For instance, according to equation 1), the value (UE_ID divided by N_PF) needs to correspond to the paging sub-group index, which is a requirement less likely to be fulfilled than the requirements according to equations 2), 3) or 4). Consequently, relatively less UEs will likely determine that the received paging sub-group index fulfills such a UE-specific requirement; conversely, relatively more UEs will likely determine that they do not belong to the paging sub-group and that the subsequent paging is not addressed to them such that they do not proceed with the paging function and thus may save power.

Equation 4) allows the requirement to be fulfilled more often than in case of equation 1), namely every time the value corresponds to a multiple of the paging sub-group index.

Equation 5) allows the network to flexibly control the sub-group size, i.e., how many UEs are addressed by the paging sub-group index. If network wants to change that, a new value Y can then be re-configured and broadcast via SIB.

The above equations however should be understood as examples only. Other variants of the requirement, following other equations, are equally possible.

The number of different possible values of the paging sub-group index influences the granularity of the sub-grouping of UEs for the paging function.

In particular, assuming for instance that the paging sub-group index only allows a differentiation between two values (e.g., 0 and 1, assuming 1 bit), the paging sub-grouping can only differentiate between two groups, and thus provides only a rough granularity of the sub-grouping. As a result, it can be assumed that on average half of the UEs processing this paging sub-group index will determine that this paging sub-group index fulfils the requirement, and conversely the other halve. Overall, thus, on average half of the UEs can be prevented from proceeding with the paging function when in fact the paging is not addressed to them. However, in the other half there may still be many UEs that in fact are not paged but still determine to be in the indicated paging sub-group and still need to proceed with the paging function.

Increasing the number of possible values of the paging sub-group index allows a finer granularity of the sub-grouping and thus a finer targeting of the UEs for paging. For instance, when exemplarily assuming that the paging sub-group index differentiates between four different values, e.g., 0, 1, 2 and 3, assuming 2 bits, the paging subgrouping equally differentiates between four different groups. Therefore, by providing one particular value of the four available paging sub-group index values, on average 25% of the UEs will be addressed, and on average 75% of the UEs could be prevented from proceeding with the paging function when in fact the paging is not addressed to them.

Consequently, with increasing paging sub-group index granularity, more sub-groups can be distinguished and thus more UEs can benefit from the possibility of saving power by not proceeding with the paging function when in fact not paged.

Moreover, in the above variants implementations of the four solutions, it was described how the requirement is UE specific by taking into account a suitable identification of the UE. According to one example, this UE identification can be that identification of the UE that was used to distribute a plurality of UEs among the plurality of paging frames and paging occasions. For instance, according to a 5G compliant solution, this identification of the UE could be the UE_ID as defined by the 5G standards to be 5G-S-TMSI mod 1024 (5G-S-TMSI: 5G Shortened-Temporary Mobile Subscriber Identifier). This UE_ID is used by the UEs and the base station to determine the paging frame and paging occasions (see above paging section).

In accordance with the above four solutions, the paging sub-group index, particularly the resulting determination of whether the UE belongs or does not belong to the paging sub-group, may be valid for a particular period of time, covering one or more paging occasions (or even paging frames). Correspondingly, the UE would not perform the remaining paging function for these one or more paging occasions, e.g., not monitoring the downlink control channel for reception of a paging DCI at these one or more paging occasions (see first, third and fourth solutions) or not receiving the paging message (see all solutions). According to an exemplary implementation, the paging sub-group index and particularly the derived determination result could be valid for a paging frame.

Second Set of Solutions

Figure 17:
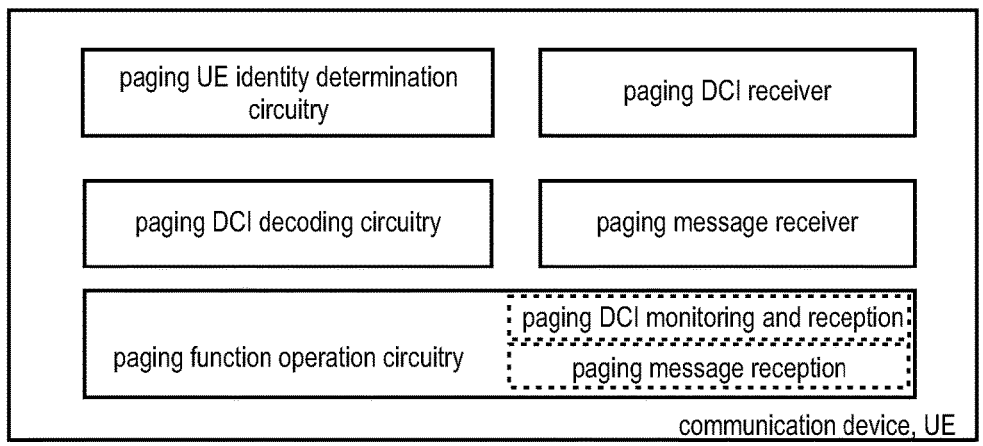
FIG. 17 illustrates a structure of the UE according to an exemplary implementation for a different solution of an improved paging procedure.

FIG. 17 illustrates a simplified and exemplary UE structure according to one exemplary solution of the improved paging procedure, which can be implemented based on the general UE structure explained in connection with FIG. 8. The various structural elements of the UE illustrated in said figure can be interconnected between one another, e.g., with corresponding input/output nodes (not shown), e.g., in order to exchange control and user data and other signals. Although not shown for illustration purposes, the UE may include further structural elements.

As apparent from FIG. 17, the UE may include a paging UE identity determination circuitry, a paging DCI receiver, a paging DCI decoding circuitry, a paging message receiver and a paging function operation circuitry.

In the present case as will become apparent from the below disclosure, the receiver of the UE can thus be exemplarily configured to at least partly perform one or more of receiving paging DCIs, and paging messages, etc.

Furthermore, in the present case as will become apparent from the below disclosure, the processing circuitry (also termed processor) of the UE can thus be exemplarily configured to at least partly perform one or more of performing a paging function determining a second paging UE identity, decoding the paging DCI, etc.

Furthermore, in the present case as will become apparent from the below disclosure, the transmitter of the UE can thus be exemplarily configured to at least partly perform one or more of transmitting a response to the paging, etc.

One exemplary solution as will be disclosed in more detail further below is implemented by a UE that includes the following. A processor of the UE operates a paging function that includes monitoring of a downlink control channel for receiving a paging downlink control information, DCI, and includes receiving of a paging message, the paging DCI and the paging message being transmitted from a base station. The processor determines a second paging UE identity, based on a first paging UE identity and an identification of the UE, the first paging UE identity being configured by the base station, wherein the second paging UE identity is usable by the UE to decode the paging DCI. A receiver of the UE receives the paging DCI. The processor then decodes the paging DCI based on the second paging UE identity. If the decoding of the paging DCI is successful, the processor proceeds to operate the paging function so as to receive the paging message as indicated by the decoded paging DCI.

Figure 18:
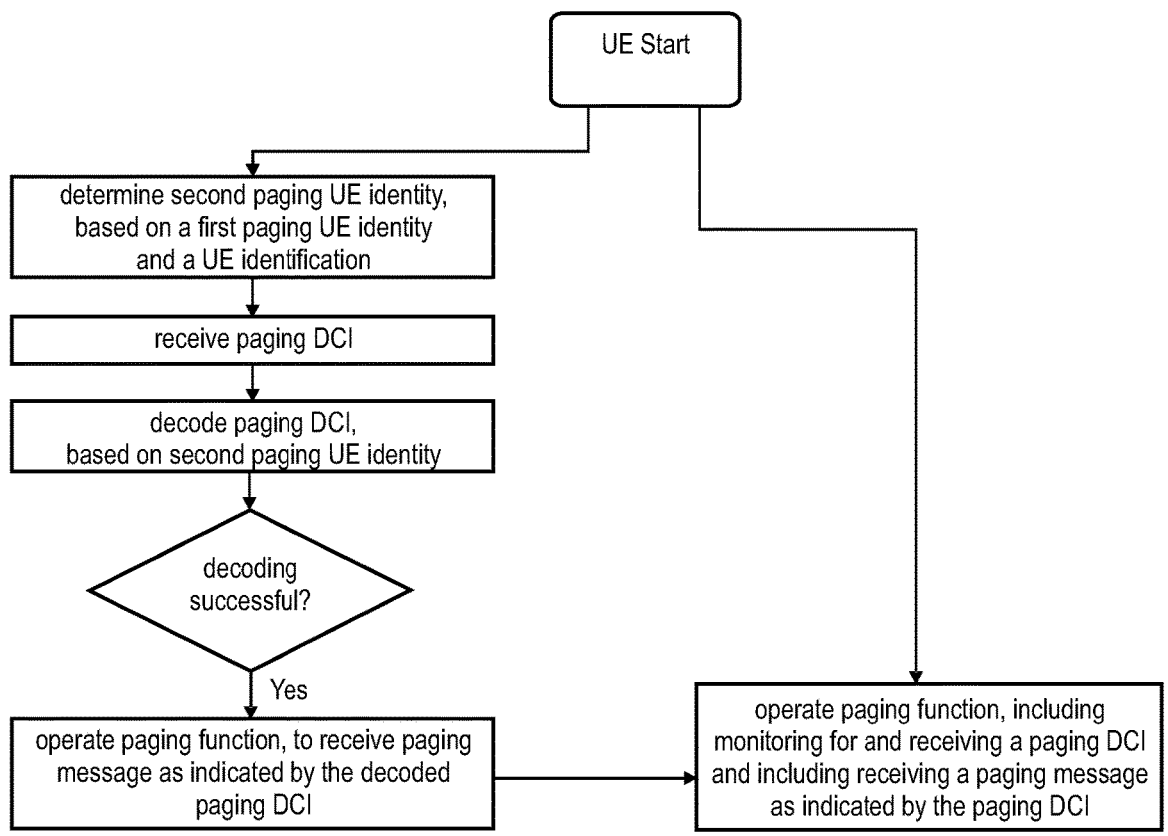
FIG. 18 is a flow diagram for the UE behavior, according to an exemplary implementation for a different solution of the improved paging procedure.

A corresponding sequence diagram for an exemplary UE behavior in line with the above-discussed UE is defined in the following and illustrated in FIG. 18. The method comprises the following steps performed by a user equipment:

operating a paging function that includes monitoring of a downlink control channel for receiving a paging downlink control information, DCI, and includes receiving of a paging message, the paging DCI and the paging message being transmitted from a base station, determining a second paging UE identity, based on a first paging UE identity and an identification of the UE, the first paging UE identity being configured by the base station, wherein the second paging UE identity is usable by the UE to decode the paging DCI, receiving the paging DCI, decoding the paging DCI based on the second paging UE identity, and if the decoding of the paging DCI is successful, proceeding to operate the paging function so as to receive the paging message as indicated by the decoded paging DCI.

According to this improved paging procedure, it is possible to control the further operation of the paging function at an early point of time based on defining suitable UE-specific paging UE identities. In particular, the second paging UE identity is generated based on a UE identification such that the second paging UE identity is specific to one or a sub-group of UEs. Correspondingly, it is possible for the UEs to save power in those cases where the UEs do not successfully decode the paging DCI based on this new second paging UE identity, e.g., because the paging is actually not intended for those UE. For instance, the UE does not waste time on receiving the paging message and then searching for its paging record in the received paging message.

Figure 19:
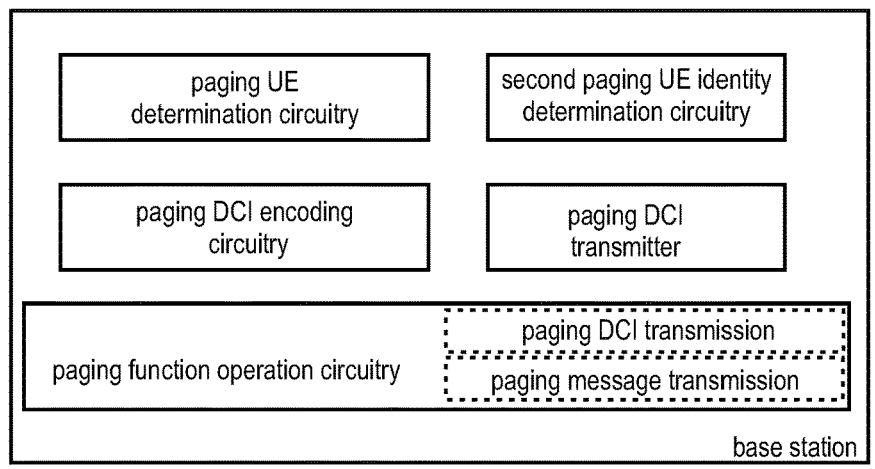
FIG. 19 illustrates a structure of the base station according to an exemplary implementation for a different solution of the improved paging procedure.

As already apparent from above, the improved paging procedure also provides an improved radio base station. FIG. 19 illustrates a simplified and exemplary base station structure according to one exemplary solution of the improved paging procedure, and can be implemented based on the general base station structure explained in connection with FIG. 8. The various structural elements of the radio base station illustrated in said FIG. 19 can be interconnected between one another, e.g., with corresponding input/output nodes (not shown), e.g., in order to exchange control and user data and other signals. Although not shown for illustration purposes, the base station may include further structural elements.

As apparent from FIG. 19, the base station may include a paging UE determination circuitry, a second paging UE identity determination circuitry, a paging DCI encoding circuitry, a paging DCI transmitter, as well as a paging function operation circuitry.

In the present case as will become apparent from the below disclosure, the receiver of the base station can thus be exemplarily configured to at least partly perform one or more of receiving a response to a paging, etc.

In the present case as will become apparent from the below disclosure, the processing circuitry of the base station can thus be exemplarily configured to at least partly perform one or more of determining a UE to be paged, of determining a second paging UE identity, of encoding a paging DCI, etc.

In the present case as will become apparent from the below disclosure, the transmitter of the base station can thus be exemplarily configured to at least partly perform one or more of transmitting a paging DCI and a paging message, etc.

One exemplary solution as will be disclosed in more detail further below is implemented by a radio base station that includes the following. A processor of the base station operates a paging function that includes transmission of a paging downlink control information, DCI, on a downlink control channel and includes transmission of a paging message, as indicated by the paging DCI. The processor determines a user equipment to be paged using the paging function. The processor determines a second paging UE identity, based on a first paging UE identity and an identification of the determined UE, the first paging UE identity being configured by the base station for the determined UE. The processor encodes the paging DCI using the second paging UE identity. A transmitter of the base station transmits the generated paging DCI and transmits the paging message as indicated by the paging DCI.

Figure 20:
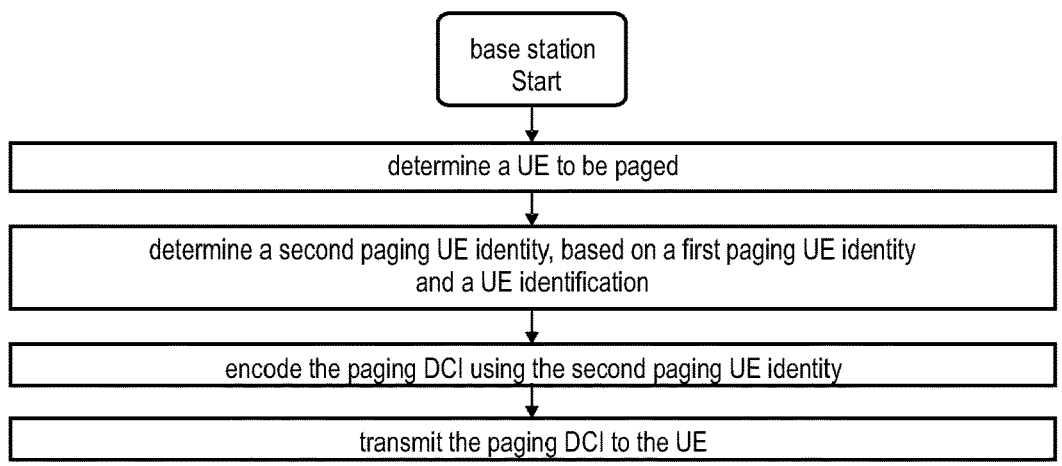
FIG. 20 is a flow diagram for the base station behavior, according to an exemplary implementation for a different solution of the improved paging procedure.

A corresponding sequence diagram for an exemplary base station behavior in line with the above-discussed base station is illustrated in FIG. 20. A corresponding method comprises the following steps performed by a base station:

operating a paging function that includes transmission of a paging downlink control information, DCI, on a downlink control channel and includes transmission of a paging message, as indicated by the paging DCI, determining a user equipment to be paged using the paging function, determining a second paging UE identity, based on a first paging UE identity and an identification of the determined UE, the first paging UE identity being configured by the base station for the determined UE, encoding the paging DCI using the second paging UE identity, and transmitting the generated paging DCI and transmitting the paging message as indicated by the paging DCI.

Correspondingly, the improved base station participates in the improved paging procedure thereby facilitating that the operation of the paging function is controlled at an early point in time, based on the paging DCI and particularly by the second paging UE identity being used for encoding the paging DCI.

For instance, by using the UP-specific paging UP identities (instead of a paging UE identity that is not specific to a UE at all), targeting a UP or a sub-group UEs for paging is facilitated. Correspondingly, it is avoided that all UPs that receive a paging DCI in a particular paging occasion need to receive and search the subsequent paging message in order to determine whether or not they are actually paged.

Figure 21:
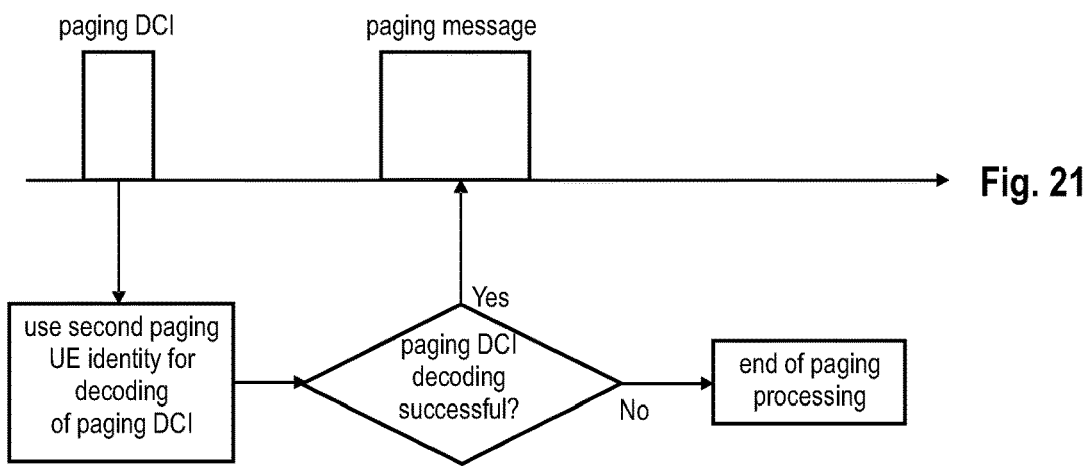
FIG. 21 illustrates a UE behavior for this different solution of the improved paging procedure.

This sequence of steps performed by the UE is illustrated in an exemplary and simplified manner in FIG. 21. As apparent therefrom, the UE uses the second paging UE identity for decoding the paging DCI. Correspondingly, the UE determines whether decoding of the paging DCI was successful, which is the case if the paging DCI was encoded at the base station also using the second paging UE identity. Particularly this can be understood as meaning that the paging could be intended for the UE or at least for a sub-group to which the UE belongs. If the decoding of the paging DCI was successful, the UE proceeds with the paging function so as to receive the paging message and also to search for the corresponding paging record within the paging message.

On the other hand, if the decoding of the paging DCI was not successfully performed by the UE, the UE can derive that the subsequent paging message is not intended for the UE and thus ends the paging processing, i.e., does not receive the paging message nor of course searches the paging message for its paging record.

This solution has the advantage that no additional overhead is created by introducing this UE-specific subgrouping of the paging, because the already necessary paging DCI is reused and because the UE-specific second paging UE identity does not introduce additional bits to be transmitted. On the other hand, a separate paging UE identity is introduced for the solution different to how legacy UPs operate (legacy UEs meaning that they do not support using this solution). Moreover, the solution requires that the UE actually monitors for and tries receiving the paging DCI so as to be able to determine whether it can be successfully decoded or not.

Above, it was described that the UE identity is determined based on a first paging UE identity and a UE identification. This may be implemented in different ways. For instance, the second paging UE identity can be determined by adding or subtracting a value that is derived from the UE identification to the first paging UE identity. This UE-identification-based value may further depend on the number of paging frames that is configured in the cell.

Optionally, in addition to adding or subtracting this UE, identification based value, in a further exemplary implementation, an offset value can be added or subtracted as well to the first paging UE identity. This offset value can be for instance configured via a system information broadcast per cell and thus can allow a better differentiation between the UEs of different cells.

Based on the above-described implementations, in the following, exemplary equations are provided on how the second paging UE identity P-RNTI' can be determined:

$$P\text{-}RNTI'=P\text{-}RNTI+(UE\_ID \text{ divided by } N\_PF), \text{ or}$$

$$P\text{-}RNTI'=P\text{-}RNTI-(U\_ID \text{ divided by } N\_PF)$$

$$P\text{-}RNTI'=P\text{-}RNTI+(U\_ID \text{ divided by } N\_PF)+\text{OFFSET, or}$$

$$P\text{-}RNTI'=P\text{-}RNTI-(UE\_ID \text{ divided by } N\_PF)-\text{OFFSET}$$

wherein P-RNTI' denotes the second paging UE identity, P-RNTI denotes the first paging UE identity, UE_ID denotes the UE identification, N_PF denotes a number of paging frames in a paging cycle configured for the UE, and OFFSET denotes an offset value that is specific to a radio cell.

Moreover, in the above solutions, it was described how the second paging UE identity is made UE specific by taking into account a suitable identification of the UE. According to one example, this UE identification can be that identification of the UE that was used to distribute a plurality of UEs among the plurality of paging frames and paging occasions. For instance, according to a 5G compliant solution, this identification of the UE could be the UE_ID as defined by the 5G standards to be 5G-S-TMSI mod 1024 (5G-S-TMSI: 5G Shortened-Temporary Mobile Subscriber Identifier). This UE_ID is used by the UEs and the base station to determine the paging frame and paging occasions (see above paging section).

Third Set of Solutions

Further solutions are based on a combination of the above first and second set of solutions as will be explained in the following. According to the above first set of solutions and second set of solutions, different concepts and ways of improving the paging procedure were introduced. In the above, these concepts and ways are explained separately from one another. However, the standalone support of one of the above solutions is merely an example.

According to further solutions, the UE and base station may simultaneously support more than one of the solutions and may then perform one of those supported solutions as needed or configured.

According to one example, it is assumed that the UE and base station support all of the above solutions, e.g., first to fourth solutions of the first set and the solution of the second set.

According to one example, which of the supported solution is actually used between the UE and the base station can be configurable. For instance, the base station can decide on the appropriate solution to be used and may inform the UEs for instance by a system information broadcast on the result of the decision. Conespondingly, the UEs and base station have the same understanding on how to perform the improved paging procedure.

The determination of which of the supported solutions should be used can be made based on a parameter of the system, such as the resource usage rate, the paging load, or other suitable parameters such as whether the power saving is to be prioritized.

By providing a flexible choice of the suitable solution for performing the improved paging procedure (e.g., configured by SIB), the improved paging procedure allows an adaptation to different use cases, taking into account the current circumstances of the system.

The following examples show how these parameters could be used to decide on determining a suitable solution to be used for the improved paging procedure performed between the UEs and the base station.

When the system resource is not congested and there is a low usage ratio, a possible additional overhead would not be problematic. Consequently, the base station may decide to follow the first solution according to which a pre-paging DCI is transmitted as the paging sub-group signaling, with the benefit that it provides a good power saving gain because UEs can be already prevented from receiving the paging DCI. Alternatively, the base station may decide in such a situation to follow the fourth solution of the first set, according to which a two-level sub-grouping for the paging operation is achieved.

On the other hand, when the number of UEs in a cell is high (i.e., high paging load) and power saving for the UEs is prioritized, the base station can decide to follow the fourth solution of the first set, according which a two-level sub-grouping for the paging operation is achieved. The power saving gain that can be achieved in such a situation is high, because of the high number of UEs and the thus high false-paging rate.

Moreover, in case system resources are congested and the resource utilization is prioritized, the base station can decide to follow the second solution of the first set, according to which the paging DCI is used as the paging sub-group signalling for conveying the paging sub-group index. This second solution of the first set is one solution that minimizes the resource usage.

Further Aspects

According to a first aspect, a user equipment, is provided that includes the following. A processor of the UE operates a paging function that includes monitoring of a downlink control channel for receiving a paging downlink control information, DCI, and includes receiving of a paging message, the paging DCI and the paging message being transmitted from a base station. A receiver of the UE receives paging sub-group signalling from the base station. The processor determines a paging sub-group index based on the received paging sub-group signalling. The processor determines how to operate the paging function based on whether or not the determined paging sub-group index fulfils a requirement that involves an identification of the UE.

According to a second aspect provided in addition to the first aspect, the paging sub-group signalling is a pre-paging DCI, and the determining of the paging sub-group index is performed using information obtained from a field of the pre-paging DCI. The determining of how to operate the paging function comprises determining to monitor for and receive the paging DCI as well as to receive the paging message, in case the determined paging sub-group index fulfils the requirement.

According to a third aspect provided in addition to the first or second aspect, the paging sub-group signalling is the paging DCI, and the determining of the paging sub-group index is performed using information from a field of the paging DCI. The determining of how to operate the paging function comprises determining to receive the paging message as indicated by the paging DCI, in case the determined paging sub-group index fulfils the requirement.

According to a fourth aspect provided in addition to one of the first to third aspects, the paging sub-group signalling is a reference signal or a synchronization signal. The determining of the paging sub-group index comprises determining a characteristic of the reference signal or of the synchronization signal and then determining the paging sub-group index based on the determined characteristic. The determining of how to operate the paging function comprises determining to monitor for and receive the paging DCI as well as to receive the paging message, in case the determined paging sub-group index fulfils the requirement.

According to a fifth aspect, provided in addition to one of the first to fourth aspects, the paging sub-group signalling is a reference signal or a synchronization signal. The determining of the paging sub-group index comprises determining a characteristic of the reference signal or of the synchronization signal and then determining a first paging sub-group index as the paging sub-group index based on the determined characteristic. The determining of how to operate the paging function comprises determining to monitor for and receive the paging DCI as well as to receive the paging message, in case the determined first paging sub-group index fulfils the requirement. In case the paging DCI is received, the processor determines a second paging sub-group index using information from a field of the paging DCI. The processor determines whether to receive the paging message as indicated by the paging DCI, based on whether the determined second paging sub-group index fulfils a second requirement that involves the identification of the UE. In an optional aspect, the determination of whether to receive the paging message comprises determining whether a combination of the first and the second paging sub-group indexes fulfils the second requirement.

According to a sixth aspect, provided in addition to the fourth or fifth aspect, the reference signal characteristic is one or more of a pattern and of a sequence of the received reference signal, wherein the determining of the reference signal pattern comprises
  determining the positions of the reference signal in the frequency domain and the time domain, and
  identifying the pattern among a plurality of reference signal patterns based on the determined positions.

Determining the reference signal sequence comprises determining the sequence of values transmitted as the reference signal. The synchronization signal characteristic is a sequence of the received synchronization signal, wherein determining the synchronization signal sequence comprises determining the sequence of values transmitted as the synchronization signal.

According to a seventh aspect provided in addition to the sixth aspect, in case the processor is not able to identify the characteristic, the processor operates the paging function so as to monitor for and receive the paging DCI as well as to receive the paging message.

According to an eighth aspect provided in addition to one of the fourth to seventh aspects, the reference signal is a Channel State Information Reference Signal, CSI-RS of a 3GPP 5G standard, and wherein the synchronization signal is a secondary synchronization signal of a 3GPP 5G standard.

According to a ninth aspect provided in addition to one of the fourth to eighth aspects, a plurality of different configurations of a reference signal is respectively used for indicating paging sub-group indexes, and wherein a first configuration of the reference signal includes a pattern that corresponds to the overlap of the pattern of some or all of the plurality of reference signals indicating paging sub-group indexes. The first configuration of the reference signal is usable by the UE for performing measurements, such as measurements for one or more of tracking of time and/or frequency and serving cell.

According to a tenth aspect provided in addition to one of the first to ninth aspects, the processor determines a second paging UE identity, based on a first paging UE identity and the identification of the UE, the first paging UE identity being configured by the base station, wherein the second paging UE identity is usable by the UE to decode the paging DCI. The receiver receives the paging DCI. The processor decodes the paging DCI based on the second paging UE identity. If the decoding of the paging DCI is successful, the processor proceeds to operate the paging function so as to receive the paging message as indicated by the decoded paging DCI.

According to an eleventh aspect, provided in addition to one of the first to tenth aspects, the requirement requires that a subset of bits of a value derived from the UE identification is the same as, or larger than, or smaller than bits representing the paging sub-group index. In an optional implementation, the subset of bits of the value is a number of the most-significant bits of the value or a number of the least-significant bits of the value, or a number of middle bits of the value. In another optional implementation, the requirement requires the paging sub-group index to fulfil one of the following equations:

$$UE\_ID \text{ divided by } N\_PF == X,$$

$$UE\_ID \text{ divided by } N\_PF > X,$$

$$UE\_ID \text{ divided by } N\_PF < X,$$

$$UE\_ID \text{ divided by } N\_PF == i*X, \text{ or}$$

$$UE\_ID \text{ divided by } N\_PF \bmod Y == X,$$

wherein UE_ID denotes the identification of the UE, N_PF denotes a number of paging frames in a paging cycle configured for the UE, X denotes the paging sub-group index, where i=0, 1, 2, 3, . . . , and where Y is a number representing a number of sub-groups.

According to a twelfth aspect, provided in addition to one of the first to eleventh aspects, the identification of the UE is that identification of the UE used so as to distribute a plurality of UEs among a plurality of paging frames and paging occasions. Optionally, the identification of the UE is determined by 5G-S-TMSI mod 1024, where the 5G-S-TMSI is a 5G Shortened-Temporary Mobile Subscriber Identifier of a 3GPP 5G standard.

According to a thirteenth aspect, provided in addition to one of the first to twelfth aspects, the paging function further comprises that the processor searches, among a plurality of paging records of the paging message, a paging record addressed to the UE.

According to a fourteenth aspect, provided in addition to the second, third, fourth, fifth and tenth aspects, the receiver, when in operation, receives an indication from the base station, the indication instructing the UE to operate according to one of the above aspects 2, 3, 4, 5 or 10.

According to a fifteenth aspect, a method is provided comprising the following steps performed by a user equipment, UE:
  operating a paging function that includes monitoring of a downlink control channel for receiving a paging downlink control information, DCI, and includes receiving of a paging message, the paging DCI and the paging message being transmitted from a base station,
  receiving paging sub-group signalling from the base station,
  determining a paging sub-group index based on the received paging sub-group signalling, and
  determining how to operate the paging function based on whether or not the determined paging sub-group index fulfils a requirement that involves an identification of the UE.

According to a sixteenth aspect, a base station is provided comprising the following. A processor of the base station operates a paging function that includes transmission of a paging downlink control information, DCI, on a downlink control channel and includes transmission of a paging message, as indicated by the paging DCI. The processor determines a user equipment to be paged using the paging function. The processor determines a paging sub-group index based on a requirement that involves an identification of the determined UE, and generates paging sub-group signalling based on the determined paging sub-group index. A transmitter of the base station transmits the generated paging sub-group signalling to the determined UE.

According to a seventeenth aspect, provided in addition to the sixteenth aspect, the transmitter transmits a pre-paging DCI as the paging sub-group signalling, and a field of the pre-paging DCI includes information usable for determining the paging sub-group index, or
  wherein the transmitter transmits the paging DCI as the paging sub-group signalling, and a field of the paging DCI includes information usable for determining the paging sub-group index, or
  wherein the transmitter transmits a reference signal or a synchronization signal as the paging sub-group signalling, and the processor, when in operation, determines a characteristic of the reference signal or the synchronization signal based on the determined paging sub-group index, wherein the reference signal characteristic is one or more of a pattern and a sequence of the reference signal, and wherein the synchronization signal characteristic is a sequence of the synchronization signal, or
  wherein the transmitter transmits a reference signal or a synchronization signal as the paging sub-group signalling, and the processor, when in operation, determines a characteristic of the reference signal or the synchronization signal based on a first paging sub-group index as the determined paging sub-group index, and wherein the transmitter transmits the paging DCI that includes information usable for determining a second paging sub-group index, usable by the UE to determine whether or not to receive the paging message,
  wherein the processor determines a second paging UE identity, based on a first paging UE identity and an identification of the determined UE, the first paging UE identity being configured by the base station for the determined UE, the processor encodes the paging DCI using the second paging UE identity, the transmitter transmits the generated paging DCI and transmits the paging message as indicated by the paging DCI.

In an optional implementation, the processor determines what to use as the paging sub-group signalling, including one of the pre-paging DCI, the paging DCI, the reference signal or the synchronization signal, and wherein the transmitter transmits an indication to one or more UEs including information on the result of the determination what to use as the paging sub-group signalling.

According to an eighteenth aspect, a method is provided comprising the following steps performed by a base station:
  operating a paging function that includes transmission of a paging downlink control information, DCI, on a downlink control channel and includes transmission of a paging message, as indicated by the paging DCI,
  determining a user equipment to be paged using the paging function,
  determining a paging sub-group index based on a requirement that involves an identification of the determined UE, and generates paging sub-group signalling based on the determined paging sub-group index, and
  transmitting the generated paging sub-group signalling to the determined UE.

According to a nineteenth aspect, an integrated circuit is provided which, in operation, controls a process of a user equipment, the process comprising the following steps performed by the user equipment:
  operating a paging function that includes monitoring of a downlink control channel for receiving a paging dor, vnlink control information, DCI, and includes receiving of a paging message, the paging DCI and the paging message being transmitted from a base station,
  receiving paging sub-group signalling from the base station,
  determining a paging sub-group index based on the received paging sub-group signalling, and
  determining how to operate the paging function based on whether or not the determined paging sub-group index fulfils a requirement that involves an identification of the UE.

According to a twentieth aspect, an integrated circuit is provided which, in operation, controls a process of a base station, the process comprising the following steps performed by the base station:
  operating a paging function that includes transmission of a paging downlink control information, DCI, on a downlink control channel and includes transmission of a paging message, as indicated by the paging DCI,
  determining a user equipment to be paged using the paging function, determining a paging sub-group index based on a requirement that involves an identification of the determined UE, and generates paging sub-group signalling based on the determined paging sub-group index, and transmitting the generated paging sub-group signalling to the determined UE According to a 21$^{st}$ aspect, a UE is provided comprising the following. A processor of the UE operates a paging function that includes monitoring of a downlink control channel for receiving a paging downlink control information, DCI, and includes receiving of a paging message, the paging DCI and the paging message being transmitted from a base station. The processor determines a second paging UE identity, based on a first paging UE identity and an identification of the UE, the first paging UE identity being configured by the base station, wherein the second paging UE identity is usable by the UE to decode the paging DCI. A receiver of the UE receives the paging DCI. The processor decodes the paging DCI based on the second paging UE identity. If the decoding of the paging DCI is successful, the processor proceeds to operate the paging function so as to receive the paging message as indicated by the decoded paging DCI.

According to a 22$^{nd}$ aspect, provided in addition to the 21$^{st}$ aspect, the determining of the second paging UE identity is performed by adding or subtracting a value derived from the UE identification to the first paging UE identity and optionally by also adding or subtracting an offset value, specific to a radio cell, to the first paging UE identity, In an optional implementation, the determining of the second paging UE identity is performed using one of the following equations:

$$P\text{-}RNTI'=P\text{-}RNTI+(UE\_ID \text{ divided by } N\_PF), \text{ or}$$

$$P\text{-}RNTI'=P\text{-}RNTI-(UE\_ID \text{ divided by } N\_PF)$$

$$P\text{-}RNTI'=P\text{-}RNTI+(UE\_ID \text{ divided by } N\_PF)+\text{OFFSET, or}$$

$$P\text{-}RNTI'=P\text{-}RNTI-(UE\_ID \text{ divided by } N\_PF)-\text{OFFSET}$$

wherein P-RNTI' denotes the second paging UE identity, P-RNTI denotes the first paging UE identity, UE_ID denotes the UE identification, N_PF denotes a number of paging frames in a paging cycle configured for the UE, and OFFSET denotes an offset value that is specific to a radio cell.

According to a 23$^{rd}$ aspect, a method is provided comprising the following steps performed by a user equipment, UE:

operating a paging function that includes monitoring of a downlink control channel for receiving a paging downlink control information, DCI, and includes receiving of a paging message, the paging DCI and the paging message being transmitted from a base station, determining a second paging UE identity, based on a first paging UE identity and an identification of the UE, the first paging UE identity being configured by the base station, wherein the second paging UE identity is usable by the UE to decode the paging DCI, receiving the paging DCI, decoding the paging DCI based on the second paging UE identity, and if the decoding of the paging DCI is successful, proceeding to operate the paging function so as to receive the paging message as indicated by the decoded paging DCL According to a 24$^{th}$ aspect, a base station is provided comprising the following. A processor operates a paging function that includes transmission of a paging downlink control information, DCI, on a downlink control channel and includes transmission of a paging message, as indicated by the paging DCI. The processor determines a user equipment to be paged using the paging function. The processor determines a second paging UE identity, based on a first paging UE identity and an identification of the determined UE, the first paging UE identity being configured by the base station for the determined UE. The processor encodes the paging DCI using the second paging UE identity. A transmitter transmits the generated paging DCI and transmits the paging message as indicated by the paging DCI.

According to a 25$^{th}$ aspect, a method is provided comprising the following steps performed by a base station:

operating a paging function that includes transmission of a paging downlink control information, DCI, on a downlink control channel and includes transmission of a paging message, as indicated by the paging DCI, determining a user equipment to be paged using the paging function, determining a second paging UE identity, based on a first paging UE identity and an identification of the determined UE, the first paging UE identity being configured by the base station for the determined UE, encoding the paging DCI using the second paging UE identity, and transmitting the generated paging DCI and transmitting the paging message as indicated by the paging DCI.

According to a 26$^{th}$ aspect, an integrated circuit is provided which, in operation, controls a process of a user equipment, the process comprising the following steps performed by the user equipment:

operating a paging function that includes monitoring of a downlink control channel for receiving a paging downlink control information, DCI, and includes receiving of a paging message, the paging DCI and the paging message being transmitted from a base station, determining a second paging UE identity, based on a first paging UE identity and an identification of the UE, the first paging UE identity being configured by the base station, wherein the second paging UE identity is usable by the UE to decode the paging DCI, receiving the paging DCI, decoding the paging ICI based on the second paging UE identity, and if the decoding of the paging DCI is successful, proceeding to operate the paging function so as to receive the paging message as indicated by the decoded paging DCI.

According to a 27$^{th}$ aspect, an integrated circuit is provided, which, in operation, controls a process of a base station, the process comprising the following steps performed by the base station:

operating a paging function that includes transmission of a paging downlink control information, DCI, on a downlink control channel and includes transmission of a paging message, as indicated by the paging DCI, determining a user equipment to be paged using the paging function, determining a second paging UE identity, based on a first paging UE identity and an identification of the determined UE, the first paging UE identity being configured by the base station for the determined UE, encoding the paging Del using the second paging UE identity, and transmitting the generated paging DCI and transmitting the paging message as indicated by the paging DCI.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g, automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT).

The communication may include exchanging data through, for example, a cellular system, a wireless LAN system, a satellite system, etc., and various combinations thereof.

The communication apparatus may comprise a device such as a controller or a sensor, which is coupled to a communication device performing a function of communication described in the present disclosure. For example, the communication apparatus may comprise a controller or a sensor that generates control signals or data signals, which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The invention claimed is:

1. A user equipment, UE, comprising:
a processor, which, in operation, operates a paging function that includes monitoring of a downlink control channel for receiving a paging downlink control information, DCI, and includes receiving of a paging message, the paging DCI and the paging message being transmitted from a base station; and
a receiver, which, in operation, receives paging sub-group signalling from the base station; wherein
the processor, in operation, determines a paging sub-group index based on the received paging sub-group signalling;
the processor, in operation, determines how to operate the paging function based on whether or not the determined paging sub-group index fulfils a requirement that involves an identification of the UE,
the processor, in operation, determines a second paging UE identity, based on a first paging UE identity and the identification of the UE, the first paging UE identity being configured by the base station, wherein the second paging UE identity is usable by the UE to decode the paging DCI,
the receiver, in operation, receives the paging DCI,
the processor, in operation, decodes the paging DCI based on the second paging UE identity, and
if the decoding of the paging DCI is successful, the processor proceeds to operate the paging function so as to receive the paging message as indicated by the decoded paging DCI.

2. The UE according to claim 1, wherein the paging sub-group signalling is a pre-paging DCI, and the determining of the paging sub-group index is performed using information obtained from a field of the pre-paging DCI,
wherein the determining of how to operate the paging function comprises determining to monitor for and receive the paging DCI as well as to receive the paging message, in case the determined paging sub-group index fulfils the requirement.

3. The UE according to claim 2, wherein the receiver, when in operation, receives an indication from the base station, the indication-instructing including instructions for the UE.

4. The UE according to claim 1, wherein the paging sub-group signalling is the paging DCI, and the determining of the paging sub-group index is performed using information from a field of the paging DCI,
wherein the determining of how to operate the paging function comprises determining to receive the paging message as indicated by the paging DCI, in case the determined paging sub-group index fulfils the requirement.

5. The UE according to claim 1, wherein the paging sub-group signalling is a reference signal or a synchronization signal,
wherein the determining of the paging sub-group index comprises determining a characteristic of the reference signal or of the synchronization signal and then determining a first paging sub-group index as the paging sub-group index based on the determined characteristic,
wherein the determining of how to operate the paging function comprises determining to monitor for and receive the paging DCI as well as to receive the paging message, in case the determined first paging sub-group index fulfils the requirement,
wherein in case the paging DCI is received, the processor, when in operation, determines a second paging sub-group index using information from a field of the paging DCI, and
wherein the processor, when in operation, determines whether to receive the paging message as indicated by the paging DCI, based on whether the determined second paging sub-group index fulfils a second requirement that involves the identification of the UE, wherein the determination of whether to receive the paging message comprises determining whether a combination of the first and the second paging sub-group indexes fulfils the second requirement.

6. The UE according to claim 1, wherein the paging sub-group signalling is a reference signal or a synchronisation signal, wherein the determining of the paging sub-group index comprises determining a characteristic of the reference signal or of the synchronisation signal and then determining the paging sub-group index based on the determined characteristic, and
wherein the determining of how to operate the paging function comprises determining to monitor for and receive the paging DCI as well as to receive the paging message, in case the determined paging sub-group index fulfils the requirement.

7. The UE according to claim 6, wherein the reference signal characteristic is one or more of a pattern and of a sequence of the received reference signal, wherein the determining of the reference signal pattern comprises:
determining the positions of the reference signal in the frequency domain and the time domain; and
identifying the pattern among a plurality of reference signal patterns based on the determined positions,
wherein determining the reference signal sequence comprises determining the sequence of values transmitted as the reference signal, and
wherein the synchronization signal characteristic is a sequence of the received synchronization signal, wherein determining the synchronization signal sequence comprises determining the sequence of values transmitted as the synchronization signal.

8. The UE according to claim 7, wherein in case the processor is not able to identify the characteristic, the processor, when in operation, operates the paging function so as to monitor for and receive the paging DCI as well as to receive the paging message.

9. The UE according to claim 6, wherein the reference signal is a Channel State Information Reference Signal, CSI-RS of a 3GPP 5G standard, and wherein the synchronization signal is a secondary synchronization signal of a 3GPP 5G standard.

10. The UE according to claim 6, wherein a plurality of different configurations of the reference signal is respectively used for indicating paging sub-group indexes, and wherein a first configuration of the reference signal includes a pattern that corresponds to the overlap of the pattern of some or all of the plurality of reference signals indicating paging sub-group indexes, the first configuration of the reference signal being usable by the UE for performing measurements, including measurements for one or more of tracking of time and/or frequency and serving cell.

11. The UE according to claim 1, wherein the requirement requires that a subset of bits of a value derived from the UE identification is the same as, or larger than, or smaller than bits representing the paging sub-group index, and
wherein the subset of bits of the value is a number of the most-significant bits of the value or a number of the least-significant bits of the value, or a number of middle bits of the value, and
wherein the requirement requires the paging sub-group index to fulfil one of the following equations:

$$\text{UE\_ID divided by N\_PF} == X; \quad\quad 1)$$

$$\text{UE\_ID divided by N\_PF} > X; \quad\quad 2)$$

$$\text{UE\_ID divided by N\_PF} < X; \quad\quad 3)$$

$$\text{UE\_ID divided by N\_PF} == i*X; \text{ and} \quad\quad 4)$$

$$\text{UE\_ID divided by N\_PF mod } Y == X, \quad\quad 5)$$

wherein UE_ID denotes the identification of the UE, N_PF denotes a number of paging frames in a paging cycle configured for the UE, X denotes the paging sub-group index, where i=0, 1, 2, 3, . . . , and where Y is a number representing a number of sub-groups.

12. The UE according to claim 1, wherein the identification of the UE is used so as to distribute a plurality of UEs among a plurality of paging frames and paging occasions,
wherein the identification of the UE is determined by 5G-S-TMSI mod 1024, where the 5G-S-TMSI is a 5G Shortened-Temporary Mobile Subscriber Identifier of a 3GPP 5G standard.

13. The UE according to claim 1, wherein the processor, when in operation, searches, among a plurality of paging records of the paging message, a paging record addressed to the UE.

14. A base station, comprising:
a processor, which, in operation, operates a paging function that includes transmission of a paging downlink control information, DCI, on a downlink control channel and includes transmission of a paging message, as indicated by the paging DCI; wherein
the processor, in operation, determines a user equipment, UE, to be paged using the paging function; and
the processor, in operation, determines a paging sub-group index based on a requirement that involves an identification of the UE, and generates paging sub-group signalling based on the determined paging sub-group index; and
a transmitter, which, in operation, transmits the generated paging sub-group signalling to the UE, wherein the processor, in operation, configures a first paging UE identity, and the transmitter, in operation,
- transmits the paging DCI to the UE, the paging DCI being decoded by the UE based on a second paging UE identity, the second paging UE identity being based on the first paging UE identity and the identification of the UE, and
- transmits the paging message according to the paging DCI.

15. The base station according to claim 14, wherein the transmitter transmits a pre-paging DCI as the paging sub-group signalling, and a field of the pre- paging DCI includes information usable for determining the paging sub-group index, or
- wherein the transmitter transmits the paging DCI as the paging sub-group signalling, and a field of the paging DCI includes information usable for determining the paging sub-group index, or
- wherein the transmitter transmits a reference signal or a synchronization signal as the paging sub-group signalling, and the processor, when in operation, determines a characteristic of the reference signal or the synchronization signal based on the determined paging sub-group index, wherein the reference signal characteristic is one or more of a pattern and a sequence of the reference signal, and wherein the synchronization signal characteristic is a sequence of the synchronization signal, or
- wherein the transmitter transmits a reference signal or a synchronization signal as the paging sub-group signalling, and the processor, when in operation, determines a characteristic of the reference signal or the synchronization signal based on a first paging sub-group index as the determined paging sub-group index, and wherein the transmitter transmits the paging DCI that includes information usable for determining a second paging sub-group index, usable by the UE to determine whether or not to receive the paging message,
- wherein the processor determines a second paging UE identity, based on a first paging UE identity and an identification of the determined UE, the first paging UE identity being configured by the base station for the determined UE, the processor encodes the paging DCI using the second paging UE identity, the transmitter transmits the generated paging DCI and transmits the paging message as indicated by the paging DCI, and
- wherein the processor determines what to use as the paging sub-group signalling, including one of the pre-paging DCI, the paging DCI, the reference signal or the synchronization signal, and wherein the transmitter transmits an indication to one or more UEs including information on the result of the determination what to use as the paging sub-group signalling.

16. A user equipment, UE, comprising:
- a processor, which, in operation, operates a paging function that includes monitoring of a downlink control channel for receiving a paging downlink control information, DCI, and includes receiving of a paging message, the paging DCI and the paging message being transmitted from a base station, wherein
- the processor, in operation, determines a second paging UE identity, based on a first paging UE identity and an identification of the UE, the first paging UE identity being configured by the base station, wherein the second paging UE identity is usable by the UE to decode the paging DCI, and
- a receiver, which, in operation, receives the paging DCI, wherein
- the processor, in operation, decodes the paging DCI based on the second paging UE identity, and
- if the decoding of the paging DCI is successful, the processor proceeds to operate the paging function so as to receive the paging message as indicated by the decoded paging DCI.

17. The UE according to claim 16, wherein the determining of the second paging UE identity is performed by adding or subtracting a value derived from the UE identification to the first paging UE identity and by also adding or subtracting an offset value, specific to a radio cell, to the first paging UE identity,
- wherein the determining of the second paging UE identity is performed using one of the following equations:

$P\text{-}RNTI'=P\text{-}RNTI+(UE\_ID$ divided by $N\_PF)$, or $P\text{-}RNTI'=P\text{-}RNTI-(UE\_ID$ divided by $N\_PF)$ $P\text{-}RNTI'=P\text{-}RNTI+(UE\_ID$ divided by $N\_PF)+\text{OFFSET}$, or $P\text{-}RNTI'=P\text{-}RNTI-(UE\_ID$ divided by $N\_PF)-\text{OFFSET}$ wherein P-RNTI' denotes the second paging UE identity, P-RNTI denotes the first paging UE identity, UE_ID denotes the UE identification, N_PF denotes a number of paging frames in a paging cycle configured for the UE, and OFFSET denotes an offset value that is specific to a radio cell.

* * * * *